US012196002B2

(12) United States Patent
Weinerman et al.

(10) Patent No.: US 12,196,002 B2
(45) **Date of Patent: *Jan. 14, 2025**

(54) LATCH APPARATUS

(71) Applicant: The Eastern Company, Cleveland, OH (US)

(72) Inventors: Lee S. Weinerman, Medina, OH (US); Scott Arthurs, Brunswick, OH (US)

(73) Assignee: THE EASTERN COMPANY, Strongsville, OH (US)

( * ) Notice: Subject to any disclaimer, the term of this patent is extended or adjusted under 35 U.S.C. 154(b) by 262 days.

This patent is subject to a terminal disclaimer.

(21) Appl. No.: 17/729,655

(22) Filed: Apr. 26, 2022

(65) Prior Publication Data

US 2022/0251878 A1 Aug. 11, 2022

Related U.S. Application Data

(63) Continuation of application No. PCT/US2022/019135, filed on Mar. 7, 2022, and a (Continued)

(51) Int. Cl.
*E05B 47/00* (2006.01)

(52) U.S. Cl.
CPC .. *E05B 47/0012* (2013.01); *E05B 2047/0016* (2013.01); *E05B 2047/0017* (2013.01);

(Continued)

(58) Field of Classification Search
CPC ........... Y10T 292/1082; Y10T 70/7102; Y10T 70/7107; Y10T 292/1043; Y10T 292/1047;

(Continued)

(56) References Cited

U.S. PATENT DOCUMENTS 3,504,511 A * 4/1970 Allen ...................... E05B 83/16 292/216
3,917,330 A * 11/1975 Quantz ................... E05B 83/16 292/201

(Continued)

FOREIGN PATENT DOCUMENTS

CN 109281549 A * 1/2019 ............. E05B 15/00
CN 109441251 A * 3/2019 ......... E05B 47/0001

(Continued)

OTHER PUBLICATIONS

Written Opinion of the International Search Authority PCT/US22/19135 Dated: Jun. 2, 2022.
International Search Report PCT/US22/19135 Dated: Jun. 2, 2022.

*Primary Examiner* — Christine M Mills
*Assistant Examiner* — Steven A Tullia
(74) *Attorney, Agent, or Firm* — Ralph E. Jocke; WALKER & JOCKE

(57) ABSTRACT

A latch (10,120,200) includes a rotatable jaw (18, 124, 204) that engages and holds a striker (32,128,210) in a latched position. A rotatable pawl (28, 132, 214) in an engaged position is operative to hold the jaw in the latched position. Movement of the pawl to a disengaged position enables the jaw to move to an unlatched position and to disengage the striker. The pawl is movable from the engaged position to the disengaged position through operation of either an electrical actuator (84, 152, 236) or through movement of an actuating end (26, 142, 224) of the pawl by a cable or similar mechanical connector (36, 246).

22 Claims, 28 Drawing Sheets

Related U.S. Application Data continuation-in-part of application No. 16/677,856, filed on Nov. 8, 2019, now Pat. No. 11,346,129.

(60) Provisional application No. 62/768,194, filed on Nov. 16, 2018.

(52) U.S. Cl.
CPC . *E05B 2047/002* (2013.01); *E05B 2047/0024* (2013.01); *E05B 2047/0069* (2013.01)

(58) Field of Classification Search
CPC .. E05B 59/00; E05B 47/0001; E05B 47/0607; E05B 2047/0014; E05B 2047/0084; E05B 2047/0085; E05B 81/14; E05B 81/15; E05B 81/66; E05B 47/0012; E05B 2047/0017; E05B 2047/002; E05B 2047/0024; E05B 2047/0069; E05C 3/24; Y10S 292/62
USPC .............................................................. 70/275
See application file for complete search history.

(56) References Cited

U.S. PATENT DOCUMENTS

| | | | | | |
|---|---|---|---|---|---|
| 4,703,961 | A * | 11/1987 | Weinerman | E05C 3/24 | 292/216 |
| 4,927,196 | A * | 5/1990 | Girard | E05B 15/0046 | 292/216 |
| 4,979,384 | A * | 12/1990 | Malesko | E05B 81/14 | 292/201 |
| 5,474,338 | A | 12/1995 | Buscher | | |
| 5,613,716 | A * | 3/1997 | Cafferty | E05B 77/36 | 292/201 |
| 6,019,402 | A * | 2/2000 | Arabia, Jr. | E05B 81/34 | 292/201 |
| 6,050,117 | A * | 4/2000 | Weyerstall | E05B 81/14 | 292/201 |
| 6,139,073 | A * | 10/2000 | Heffner | E05B 83/40 | 292/201 |
| 6,149,210 | A | 11/2000 | Hunt et al. | | |
| 6,386,599 | B1 | 5/2002 | Chevalier | | |
| 7,264,283 | B2 * | 9/2007 | Stoof | E05B 85/243 | 292/201 |
| 8,016,329 | B2 * | 9/2011 | Johansson | E05C 3/24 | 292/DIG. 31 |
| 8,075,027 | B2 * | 12/2011 | Zweibohmer | E05C 3/24 | 292/216 |
| 8,496,275 | B2 * | 7/2013 | Garneau | E05C 3/24 | 292/201 |
| 8,672,368 | B2 * | 3/2014 | Grosdemouge | E05B 85/02 | 292/216 |
| 9,546,503 | B2 * | 1/2017 | Krueger | E05B 47/06 | |
| 9,809,999 | B2 | 11/2017 | Weinerman et al. | | |
| 9,915,082 | B2 * | 3/2018 | Garneau | E05B 65/46 | |
| 10,294,695 | B2 * | 5/2019 | Garneau | E05B 65/46 | |
| 11,536,061 | B2 * | 12/2022 | Sturm | E05B 81/70 | |
| 2006/0208503 | A1 * | 9/2006 | Simchayoff | E05B 85/045 | 292/216 |
| 2008/0252083 | A1 * | 10/2008 | Carabalona | E05B 81/20 | 292/49 |
| 2010/0139338 | A1 * | 6/2010 | Wintersteiger | E05B 47/0004 | 70/264 |
| 2011/0204690 | A1 * | 8/2011 | Torkowski | E05B 81/14 | 292/201 |
| 2011/0227351 | A1 * | 9/2011 | Grosdemouge | E05B 85/02 | 292/201 |
| 2011/0260475 | A1 | 10/2011 | Spurr et al. | | |
| 2016/0032629 | A1 * | 2/2016 | Rahilly | E05C 3/12 | 292/197 |

FOREIGN PATENT DOCUMENTS

| | | | | | |
|---|---|---|---|---|---|
| CN | 114645640 | A * | 6/2022 | E05B 15/00 |
| EP | 3853432 | B1 * | 2/2023 | E05B 47/0012 |
| JP | 2002537507 | A * | 11/2002 | E05B 81/14 |
| WO | WO-03025319 | A1 * | 3/2003 | E05B 81/14 |
| WO | WO-2004016888 | A1 * | 2/2004 | E05B 47/0607 |
| WO | WO-2005008000 | A2 * | 1/2005 | E05B 17/22 |
| WO | WO-2008064234 | A2 * | 5/2008 | E05B 81/14 |

* cited by examiner

LATCH APPARATUS

TECHNICAL FIELD

Exemplary arrangements relate to latches which are operative to selectively hold and release a closure member. Exemplary arrangements further relate to latches that can be selectively released in response to either electrical or mechanical actuation.

BACKGROUND ART

Latches are often used to hold a closure member in engagement with another structure, and to then selectively release the closure member so that an interior area of the structure may be accessed. For example, latches may be used to hold a door in engagement with a cabinet or other container. The latch may be operative to hold the closure member in covering relation with an opening to the container to prevent unauthorized access to the interior of the container. The latch can be selectively released when access to the interior of the container is to be provided to an authorized person. Of course it should be understood that latches may be used in many different types of applications and situations.

Latch apparatus may benefit from improvements.

SUMMARY OF DESCRIPTION

Exemplary arrangements relate to a latch that is operative to hold a striker that is in fixed connection with a closure member. The latch includes a jaw which in a latched position is operative to hold the striker in engagement with the latch. The latch is selectively operative to enable the jaw to move from the latched position to an unlatched position in which the striker may disengage from the latch. When the striker disengages from the latch the closure member may be moved from a first position in which the striker is engaged with the jaw, to a second position in which the striker is disposed away from the latch. This may correspond to an open position of the closure member, which enables an interior area of the container associated with the latch to be accessed. In exemplary arrangements the latch may be reengaged with the striker by moving the striker into engagement with the jaw so as to return the jaw to the latched position.

In exemplary arrangements the jaw is selectively held in the latched position by a pawl. In an engaged position of the pawl, the pawl is operative to engage the jaw and hold it in the latched position. The pawl is selectively movable from the engaged position to a disengaged position in which the jaw is enabled to move from the latched position to the unlatched position.

In the exemplary arrangement the pawl is in operative connection with an electric actuator within the housing of the latch. The actuator is operative responsive to electrical signals to move the pawl from the engaged position to the disengaged position. The exemplary pawl further includes an actuating end that extends outside the housing of the latch. Movement of the actuating end such as by a cable, rod or other movable member, is alternatively operative to cause the pawl to move from the engaged position to the disengaged position. In the exemplary arrangement the pawl may be selectively moved from the engaged position to the disengaged position by either the electric actuator or the actuating end.

Exemplary arrangements include further useful features and capabilities as described in greater detail hereafter.

DETAILED DESCRIPTION

Figure 1:
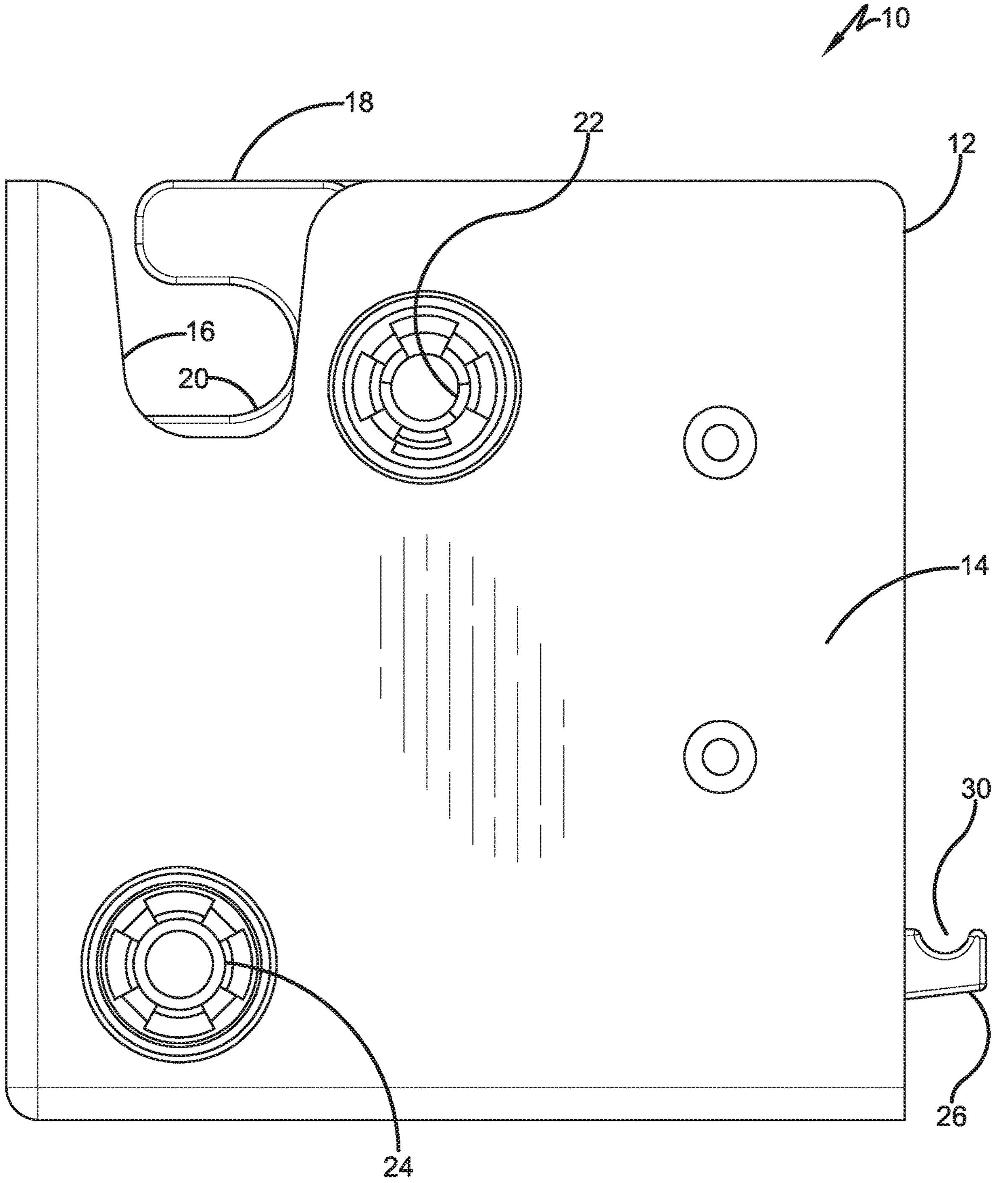
FIG. 1 is a right side view of an exemplary latch shown with the jaw of the latch in the engaged position.

Referring now to the drawings and particularly to FIG. 1 there is shown therein a latch of an exemplary arrangement generally indicated 10. Latch 10 includes a housing 12. The exemplary housing is comprised of two laterally disposed side plates 14 with a space in between that houses latch components.

The housing includes a recess in each side plate that bound a U-shaped housing recess 16. A jaw 18 is movable relative to the recess 16. Exemplary jaw 18 is rotatably movable relative to the housing and includes a notch 20. The latch further includes a pair of posts 22, 24. The exemplary posts 22, 24 extend intermediate of the side plates 14 and hold the latch components in engaged relation. In the exemplary arrangement the posts 22, 24 include openings therethrough that are usable for extending fasteners or other items therethrough for purposes of mounting the latch 10. The exemplary latch further includes an actuating end 26 of a rotatable pawl 28 (see FIG. 4). The exemplary actuating end 26 extends outside the housing and includes a cable engaging recess 30 that operates in a manner like that hereafter discussed.

Figure 2A:
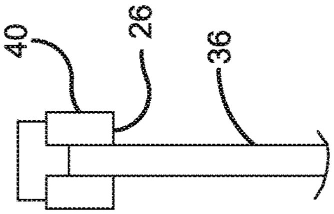
FIG. 2A is a partial back view of the pawl in engagement with the cable.
Figure 2:
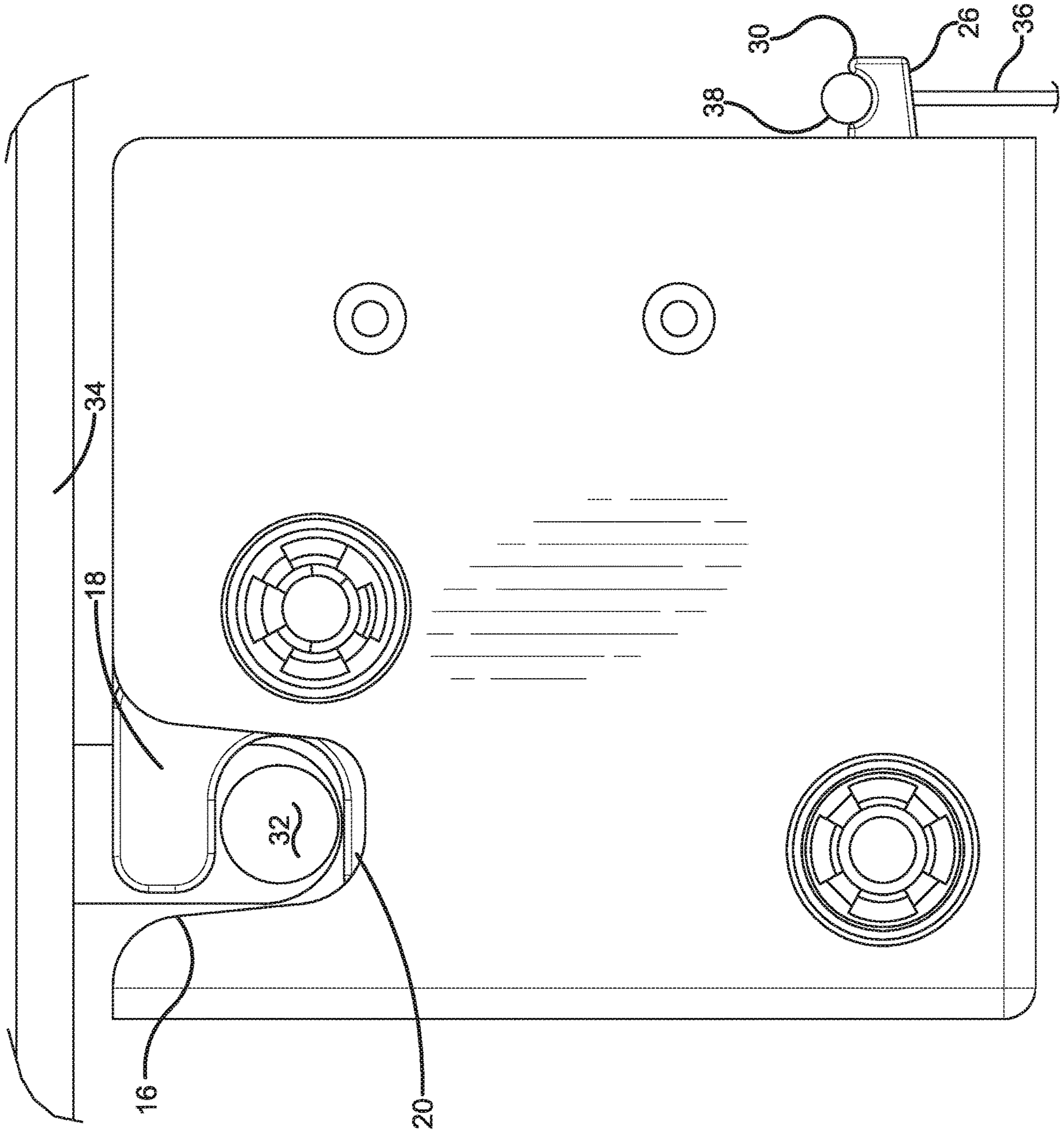
FIG. 2 is a right side view of the exemplary latch shown in engagement with a striker and closure member, with the actuating end of the pawl in engagement with a cable.
Figure 3:
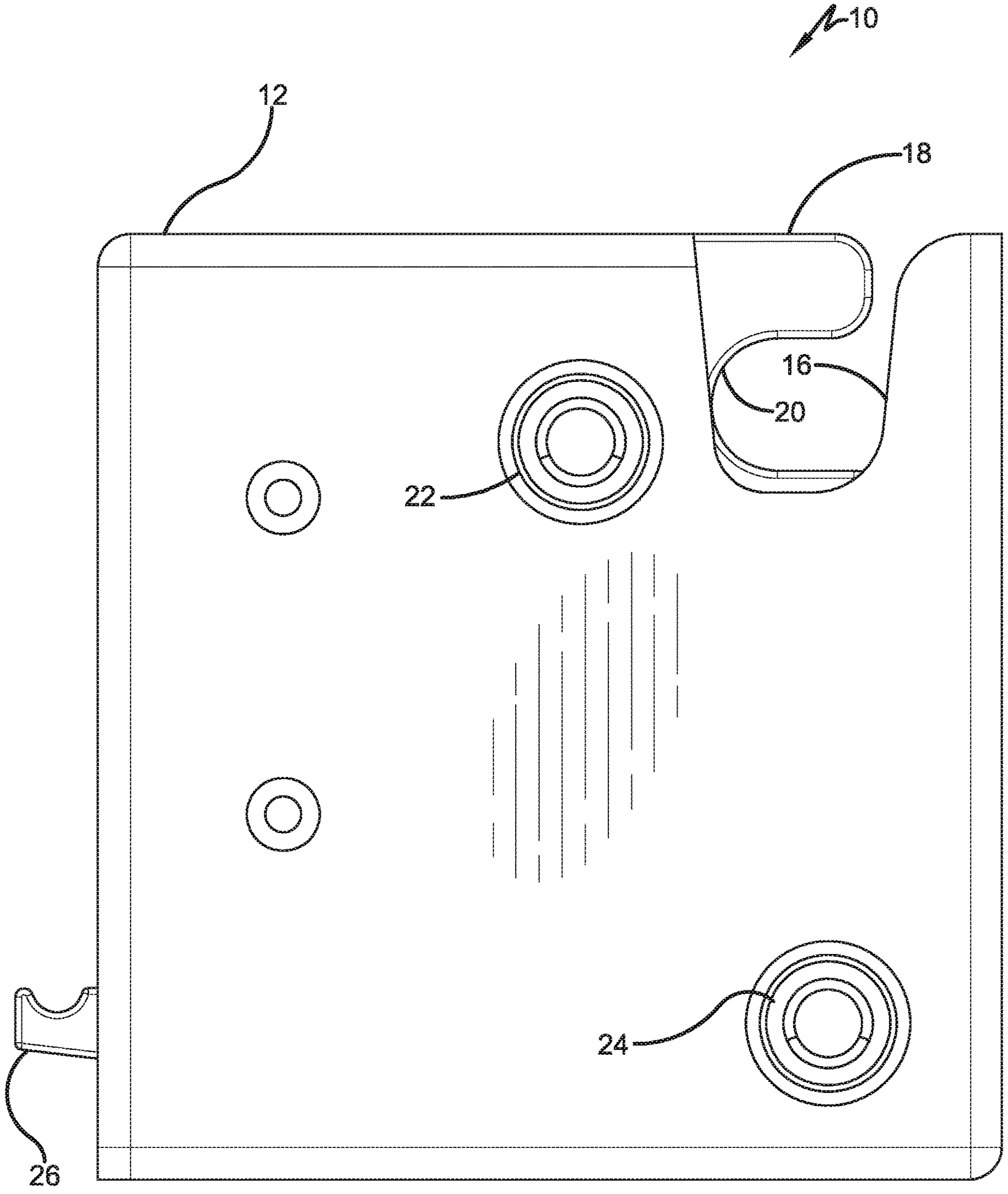
FIG. 3 is a left side view of the exemplary latch with the jaw in the latched position.

As shown in FIG. 2, in the latched position of the jaw 18 the notch 20 and recess 16 are configured to engage a striker 32. The exemplary striker 32 is in fixed attached engagement with a closure member 34. In an exemplary arrangement the closure member may comprise a door or other device that is held in position by the latch when the jaw 18 is in the latched position. Also as shown in FIG. 2 and FIG. 2A, the actuating end 26 of an exemplary pawl is in operative attached connection with a cable 36. In the exemplary arrangement the cable 36 is in attached connection with an enlarged cylindrical end 38. The cylindrical end 38 is configured to engage the recess 30. In the exemplary arrangement the actuating end 26 includes a pair of disposed fork portions through which the exemplary cable 36 extends. Of course it should be understood that this configuration is exemplary and in other arrangements other approaches and members may be used.

Figure 4:
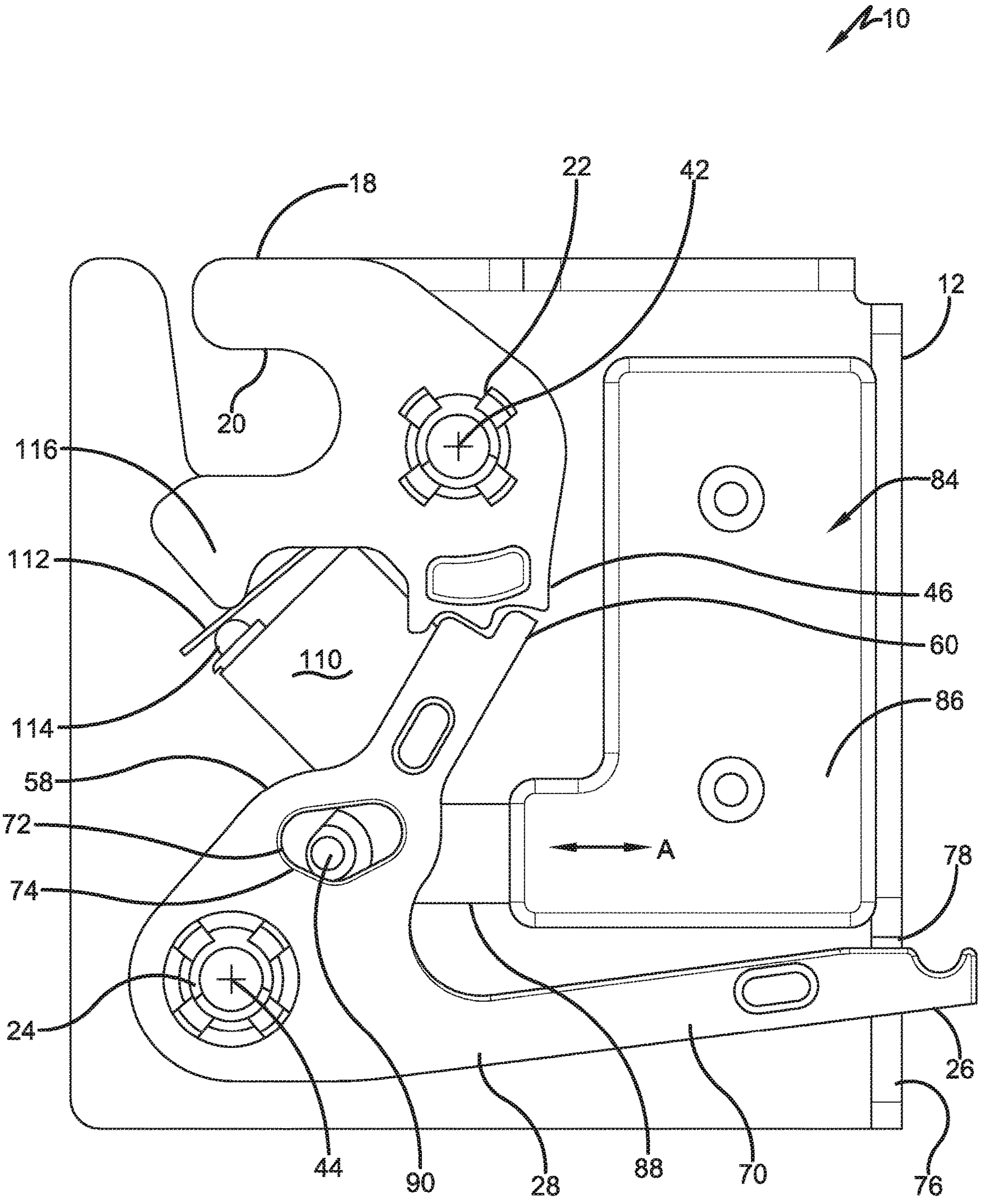
FIG. 4 is a right side sectional view showing the interior of the exemplary latch and the components therein and with the jaw in the latched position.

As shown in FIG. 4, the exemplary jaw 18 is rotatably movably mounted in operative connection with the housing. The exemplary jaw 18 is rotatably movable about the post 22 and an axis 42 which is in centered relation relative to the post 22. Axis 42 is alternatively referred to herein as a jaw pivot. The exemplary pawl 28 is rotatably movably mounted in operative connection with the housing. The pawl 28 is rotatable about the post 24 and an axis 44 which is in centered relation relative to the post 24. Axis 44 is alternatively referred to herein as a pawl pivot.

In this exemplary arrangement the jaw 18 is substantially L-shaped and includes an inner end 46. The inner end of the jaw is disposed on an opposed side of the jaw pivot from the notch 20. As better shown in FIG. 7 the inner end 46 of jaw 18 includes a plurality of jaw engagement projections 48, 50, 52 and a plurality of jaw engagement recesses 54, 56. While in the exemplary arrangement the inner end of jaw 18 includes three jaw engagement projections and two jaw engagement recesses, this configuration is merely exemplary and in other arrangements other numbers of projections, recesses or other engaging features may be used.

In the exemplary arrangement the pawl 28 includes a first arm portion 58. The first arm portion 58 radially extends relative to the pawl pivot 44. First arm portion 58 terminates radially outward at a distal end 60. As better shown in FIG. 7, distal end 60 includes pawl engagement projections 62, 64 and pawl engagement recesses 66, 68. Of course it should be understood that this arrangement comprising two engagement projections and engagement recesses is exemplary and in other arrangements different types and numbers of engaging structures configured for engaging the distal end of the pawl and the inner end of the jaw may be used.

The exemplary pawl 28 further includes a second arm portion 70. The second arm portion 70 extends radially away from the pawl pivot 44 and terminates outwardly at the actuating end 26. In the exemplary arrangement the distal end of the first arm portion 58 is angularly disposed from the actuating end of second arm portion 70 relative to the pivot, at an acute angle AA (see FIG. 11). Of course it should be understood that this arrangement is exemplary and in other arrangements other configurations may be used.

In the exemplary arrangement the first arm portion 58 includes an opening 72 that is alternatively referred to herein as an arm slot. The arm slot 72 is positioned radially intermediate of the pawl pivot 44 and the distal end 60. The exemplary arm slot 72 extends through the pawl and is bounded by an arm slot side wall 74. In the exemplary arrangement the arm slot 72 is arcuately elongated relative to the pivot and linearly elongated and has an elongated and widened generally oval-shape for reasons that are later discussed. However in other arrangements other configurations may be used.

The exemplary housing 12 includes an arm portion opening 76. The second arm portion 70 of the pawl 28 extends through the arm portion opening 76 such that the actuating end 26 of the second arm portion movably extends outside the housing. In the exemplary arrangement the arm portion opening 76 is bounded by pawl stop 78. In the exemplary arrangement the pawl stop 78 bounds one side of the arm portion opening 76 and serves to limit rotation of the pawl in the counterclockwise direction as shown, to the engaged position of the pawl in which the distal end 60 of the pawl is in engagement with the inner end 46 of the jaw. Of course this configuration is exemplary and in other arrangements other forms of stops or structures for limiting movement of the pawl may be used.

In the exemplary arrangement of the latch, the jaw 18 is in operative connection with a jaw spring schematically indicated 80. In the exemplary arrangement the jaw spring 80 is operative to bias the jaw 18 so as to urge the jaw to rotate in a clockwise direction about the jaw pivot 42 as shown. In some exemplary arrangements the jaw spring comprises a torsion spring that extends in surrounding relation of the post 22. Of course it should be understood that this configuration is exemplary and in other arrangements other types of jaws, springs and spring configurations may be used.

Figure 5:
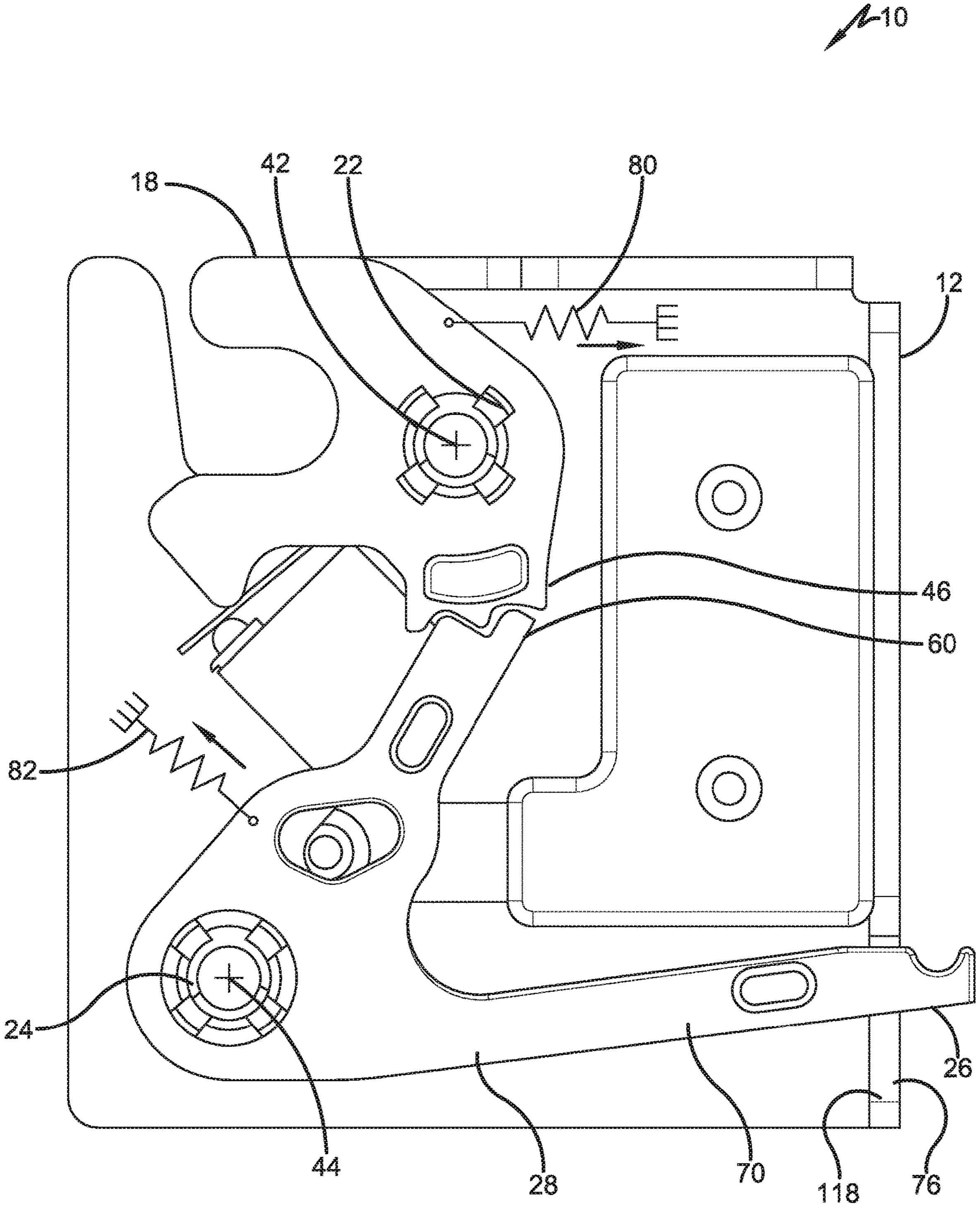
FIG. 5 is a view similar to FIG. 4 that includes a schematic representation of the springs that act on the jaw and the pawl of the exemplary arrangement.

In this exemplary arrangement of the latch, the pawl 28 is in operative connection with a pawl spring which is schematically indicated 82. In this exemplary arrangement the pawl spring 82 is operative to rotationally bias the pawl 28 in a counterclockwise direction relative to the pawl pivot 44 as shown. The exemplary pawl spring 82 is operative to bias the distal end 60 of the first arm portion of the pawl 28 into engagement with the inner end 46 of the jaw 18. In such engaged position of the pawl and in the latched position of the jaw as shown in FIGS. 4 and 5, the pawl is operative to hold the jaw in the latched position as shown. In the exemplary arrangement the pawl spring comprises a torsion spring that extends in surrounding relation of the post 24. However in other exemplary arrangements other types of spring arrangements and configurations may be used.

The exemplary latch further includes an electric actuator 84. Electric actuator 84 extends in the housing 12. The electric actuator is in connection with wires or other electrical conductors (not shown) through which electrical signals are received. The exemplary actuator 84 includes a case 86 which houses internal components of the actuator which are later described in detail. A tie rod 88 extends outside the case. The tie rod 88 is selectively movable linearly straight in the direction of Arrow A. The tie rod 88 is connected to a pin 90. The pin 90 extends transversely in the arm slot 72.

Figure 11:
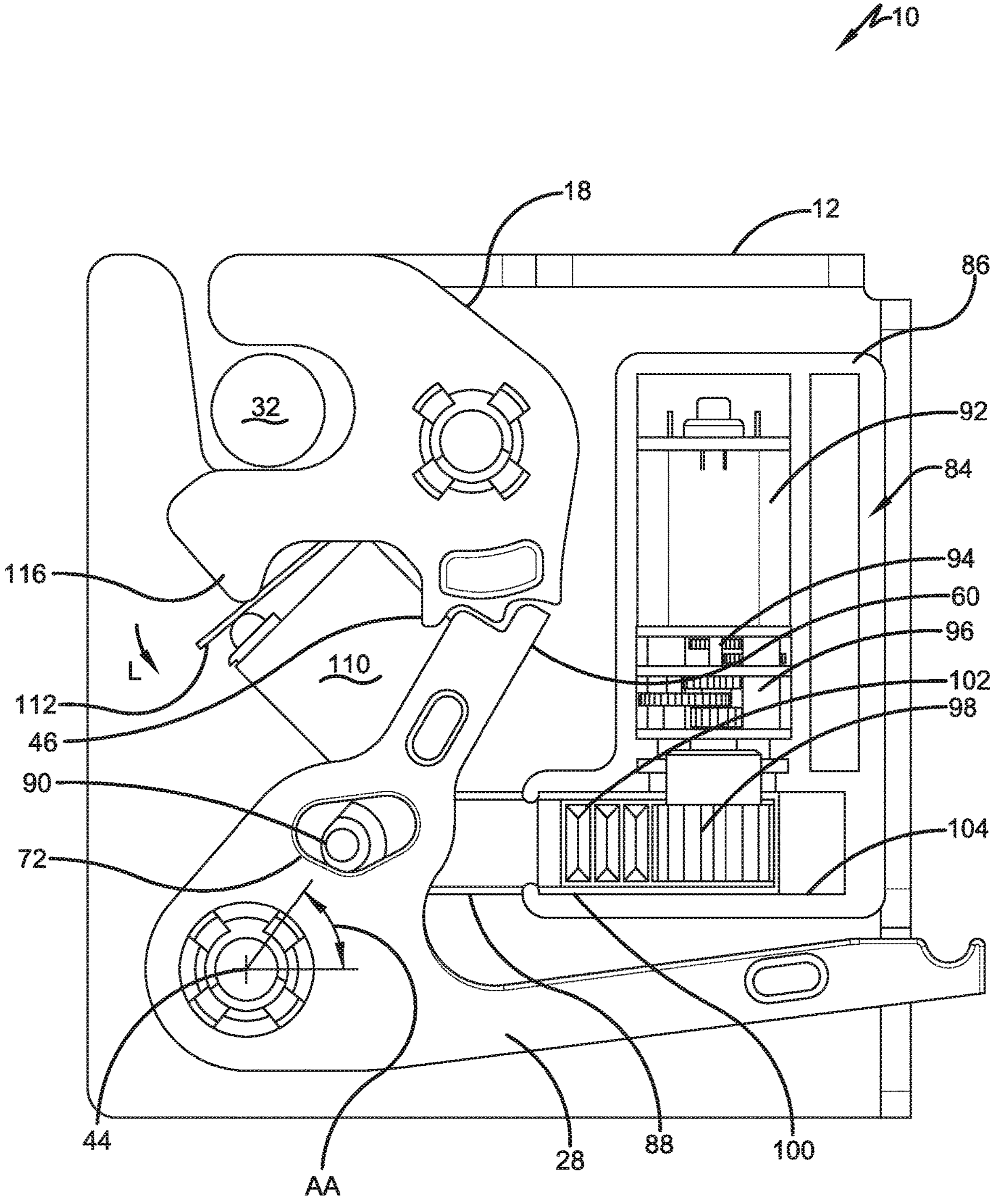
FIG. 11 is a sectional view showing the latch with the jaw in the latched position and in engagement with the striker.
Figure 12:
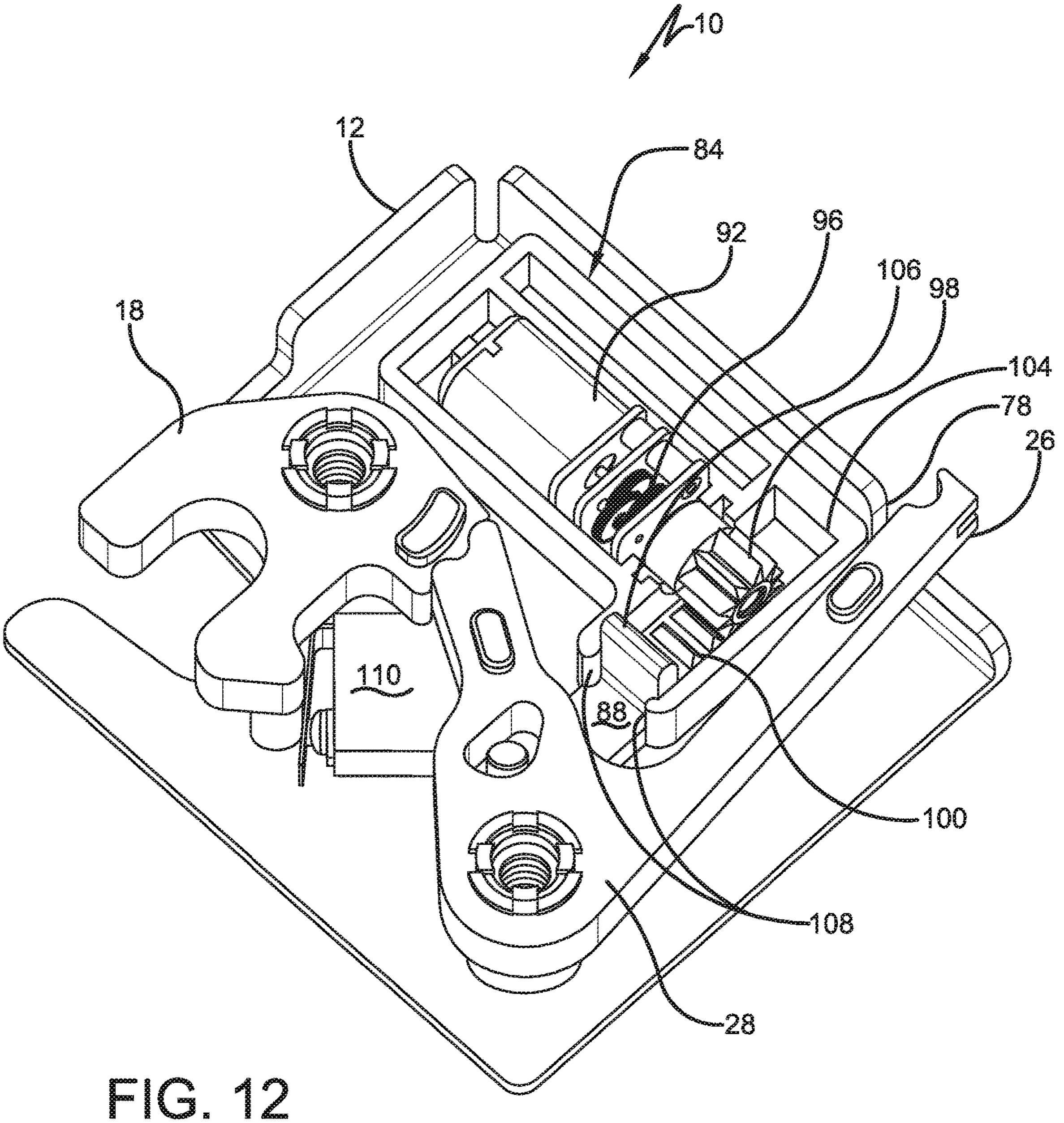
FIG. 12 is a perspective view of the latch with the jaw in the latched position as shown in FIG. 11.
Figure 13:
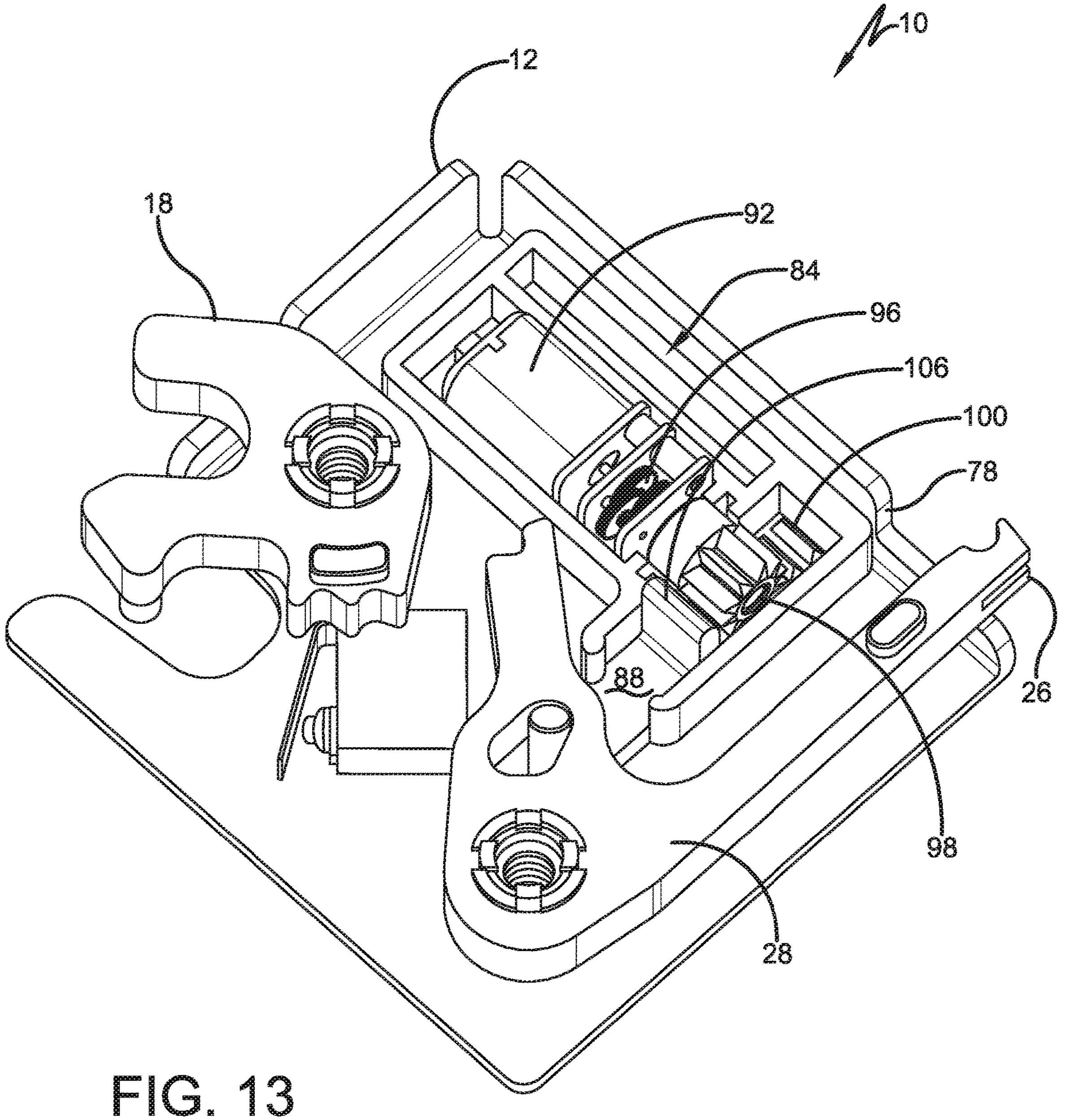
FIG. 13 is a perspective view of the electric actuator operating to move the pawl to the disengaged position to cause the jaw to move to the unlatched position.

As shown in detail in FIGS. 11-13 the actuator 84 includes a motor 92 which is positioned inside the case 86. The motor includes an output shaft 94. The output shaft 94 of the motor is selectively rotatable in either rotational direction. The output shaft 94 of the motor is operative to rotate a plurality of gears that are included in a gearbox 96. The gearbox 96 includes an output shaft that is in operative connection with a pinion 98. The gearbox 96 is operative to step down the speed from the output shaft 94 of the motor so that the pinion 98 rotates at a lower speed than the output shaft of the motor.

In the exemplary arrangement a rack 100 is in operative connection with the pinion 98. The rack 100 includes rack gear teeth 102 thereon that are in meshing engagement with the gear teeth on the pinion. The rack is guided to move within a track 104 within the case 86 so that the rack is caused to move linearly straight and selectively inward and outward from an opening in the case. The tie rod 88 is operatively connected to the rack 100 such that rotation of the pinion 98 causes movement of the tie rod 88 and the pin 90.

In the exemplary arrangement the rack 100 is in operative connection with a bumper 106. In the exemplary arrangement the bumper 106 is operative to limit movement of the rack in a direction away from the pinion 98 as well as toward the pinion 98. As represented in FIG. 12 movement of the rack 100 away from the pinion 98 is limited by engagement of the bumper 106 with inward extending stops 108 which extend at the opening to the track 104. As shown in FIG. 13 the bumper 106 limits inward travel of the rack 100 by engagement with the pinion 98. Of course it should be understood that this approach to limiting travel of the rack is exemplary and in other arrangements other approaches may be used.

In the exemplary arrangement an electrical switch 110 is positioned within the housing 12. The exemplary switch 110 includes a resilient lever 112. The switch 110 includes a plunger 114. The exemplary switch changes its electrical condition responsive to movement of the resilient lever 112 as the lever 112 engages and moves the plunger 114.

The exemplary jaw 18 includes a jaw switch projection 116. The jaw switch projection 116 is configured to operatively engage the resilient lever 112 and to cause movement and positioning of the resilient lever so as to change the electrical condition of the switch 110. For example as shown in FIG. 4, in the latched position of the jaw 18 the jaw switch projection engages the lever 112 and causes movement thereof so that the plunger 114 is depressed. This causes switch 110 to be in a first electrical condition which is indicative that the jaw is in the latched position.

Figure 7:
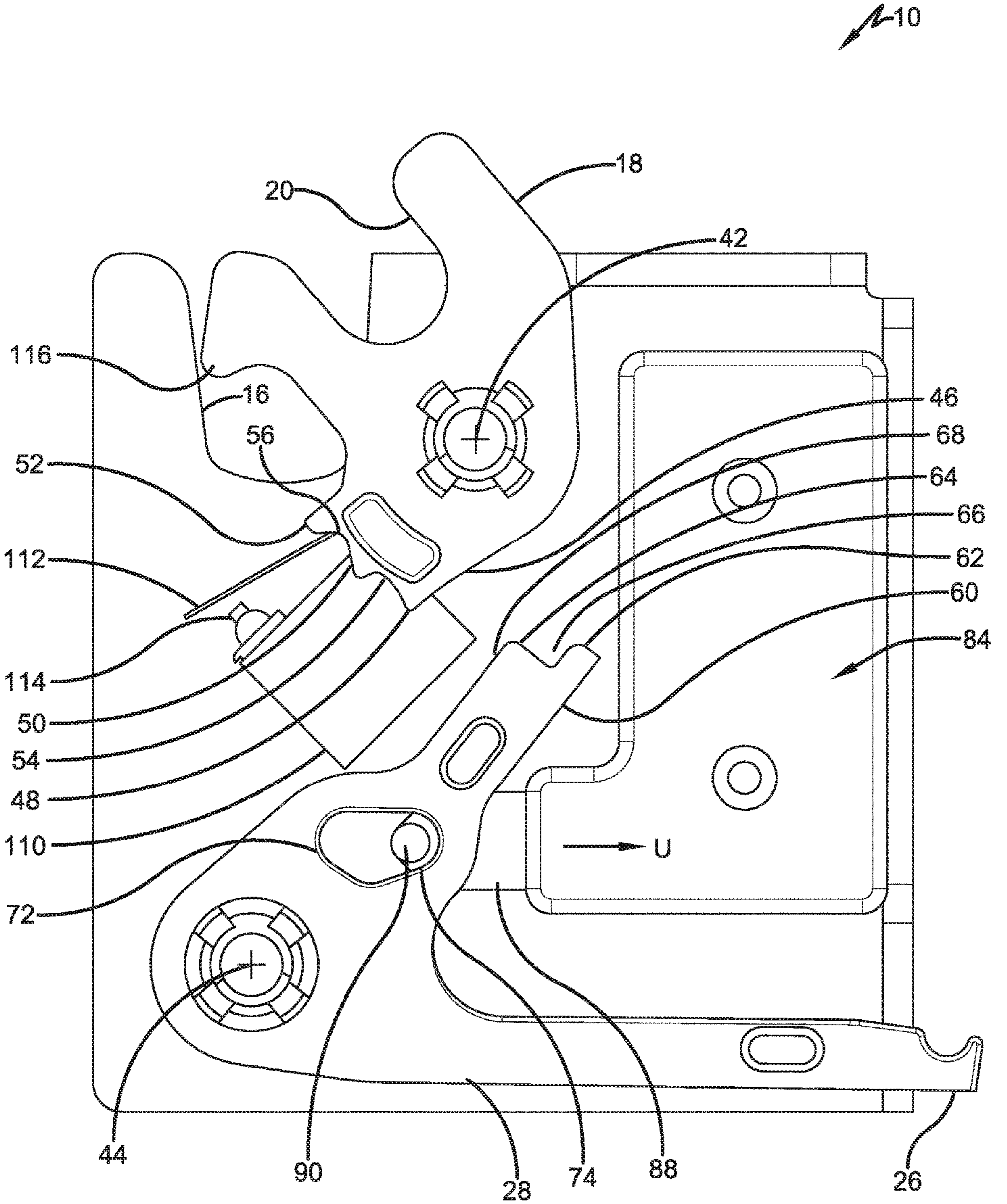
FIG. 7 is a sectional view showing the internal components of the latch with the jaw in an unlatched position.

When the jaw 18 moves to the unlatched position such as is shown in FIG. 7, the jaw switch projection 116 moves away from the resilient lever 112. The lever 112 moves away from the plunger 114 which causes the switch 110 to be in a second electrical condition that is different from the first electrical condition. In this way it can be detected that the jaw 18 is in the latched or unlatched position. Of course it should be understood that this configuration is exemplary and in other arrangements other approaches may be utilized to indicate the position of the jaw and/or the condition of the latch.

Figure 6:
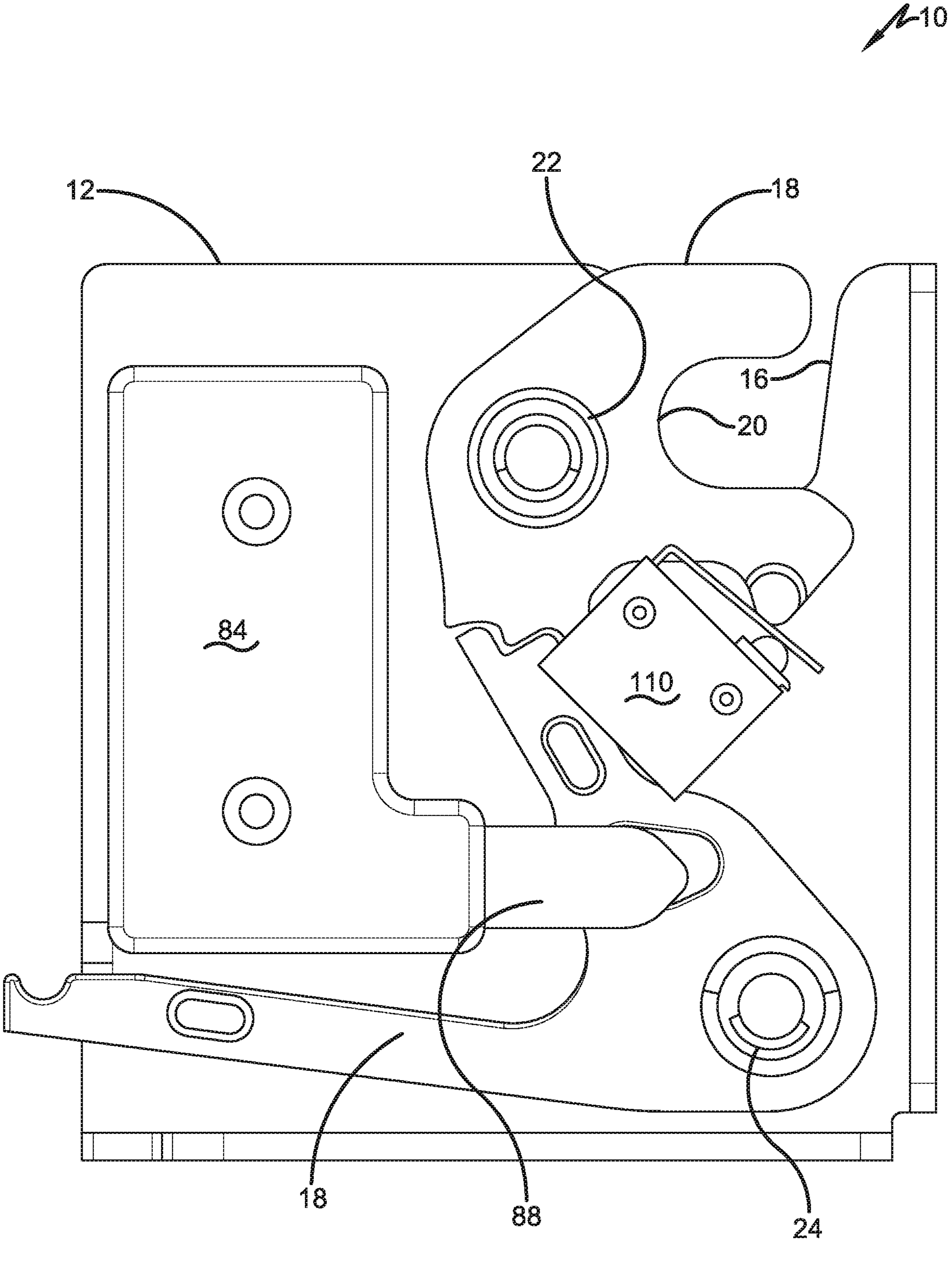
FIG. 6 is a left side sectional view of the latch showing the components within the latch with the jaw in the latched position.

In operation of the latch when the jaw 18 is in the latched position and the pawl 28 is in the engaged position as shown in FIGS. 4, 5 and 6, the jaw engagement projections and jaw engagement recesses are interengaged with respective pawl engagement recesses and projections. Such interengagement of the corresponding projections and recesses on the distal end 60 of the pawl and the inner end 46 of the jaw are operative to hold the jaw in the latched position. As can be appreciated when the striker is engaged in the notch 20 of the jaw and in the recess 16 of the housing, such as is shown in FIG. 2, the striker is prevented from disengaging from the jaw and the recess. The forces applied to the jaw by jaw spring 80 and the pawl by pawl spring 82 are operative to hold the jaw and the pawl in engaged relation such that forces that may be applied by the striker and that attempt to rotate the jaw toward the unlatched position are resisted by the pawl.

Figure 8:
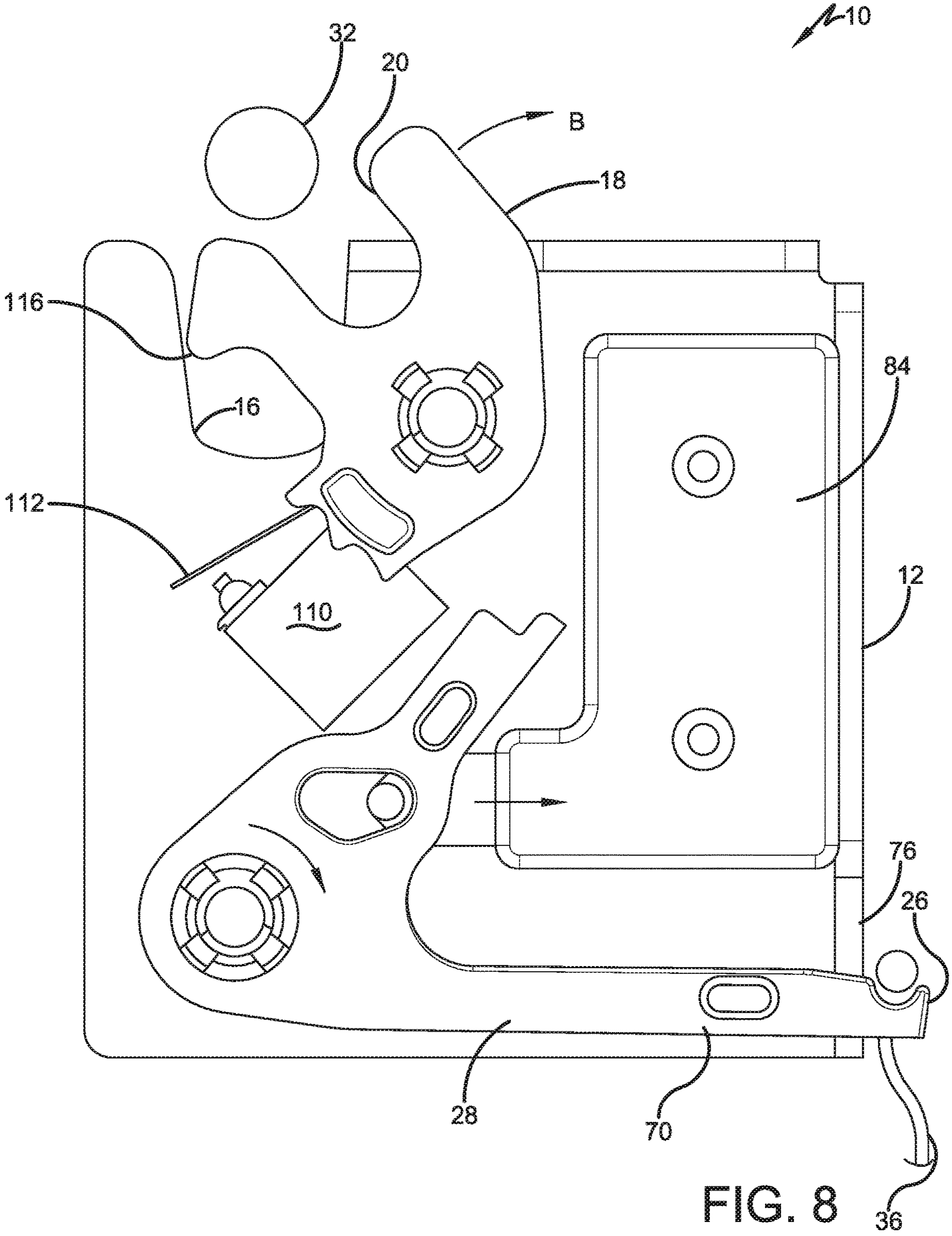
FIG. 8 is a sectional view similar to FIG. 7 showing disengagement of the striker from the jaw in the unlatched position of the jaw.

When the jaw is desired to be moved to the unlatched position such as is shown in FIGS. 7 and 8 through operation of the electrical actuator 84, electrical power is applied to the motor 92. Rotation of the motor 92, the output shaft 94 and the gears in the gearbox 96 are operative to cause the pinion 98 to rotate, causing the rack 100 to move from the position shown in FIG. 12 to the position shown in FIG. 13. Such movement of the rack 100 causes the tie rod 88 to move toward the actuator in the direction of Arrow U shown in FIG. 7. Such movement causes the pin 90 to move linearly within the slot 72 and engage the arm slot sidewall 74 which bounds the slot. Movement of the pin 90 in engagement with the side wall is operative to cause the pawl 28 to move in a clockwise direction as shown about the pawl pivot 44 against the force of the pawl spring 82. Such movement of the pin 90 causes the distal end 60 of the pawl to move from the engaged position to the disengaged position shown in FIGS. 7 and 8. Such movement of the pawl enables the jaw to rotate about the jaw pivot 42 assisted by the force applied by the jaw spring 80 as indicated by Arrow B. The jaw moves rotationally from the latched position to the unlatched position shown in FIGS. 7 and 8 so that the striker 32 may move out of and disengage from the notch 20 and the housing recess 16.

As represented in FIG. 8, the movement of the jaw 18 to the unlatched position causes the jaw switch projection 116 to disengage from the lever 112 such that the switch 110 changes its electrical condition. Further in the exemplary arrangement the actuating end 26 of the second arm portion 70 of the pawl 28 moves within the opening 76 in the housing 12. In the exemplary arrangement such movement is accommodated by the cable 36 flexing or otherwise accommodating the slack that results from the movement of the actuating end 26. Of course these approaches are exemplary and in other arrangements other approaches may be used.

In the exemplary arrangement the actuator is operated to enable the pawl 28 to rotate to return to a position in which the pawl can again engage the jaw when the jaw is moved from the unlatched position toward the latched position. In the exemplary arrangement this is done by the motor of the actuator operating in an opposite rotational direction from the direction of rotation when the actuator unlatches the pawl. The actuator operates to cause the tie rod 88 and the pin 90 to return to the positions shown in FIGS. 9 and 11. In exemplary arrangements the bumper 106 assures that the actuator returns to the proper position. In this position the pawl 28 is biased by the pawl spring 82 to rotate in a counterclockwise direction about the pawl pivot 44. In the exemplary arrangement the pawl 28 rotates counterclockwise as shown responsive to the spring until the second arm portion engages the pawl stop 78 that bounds the pawl opening 76.

Figure 9:
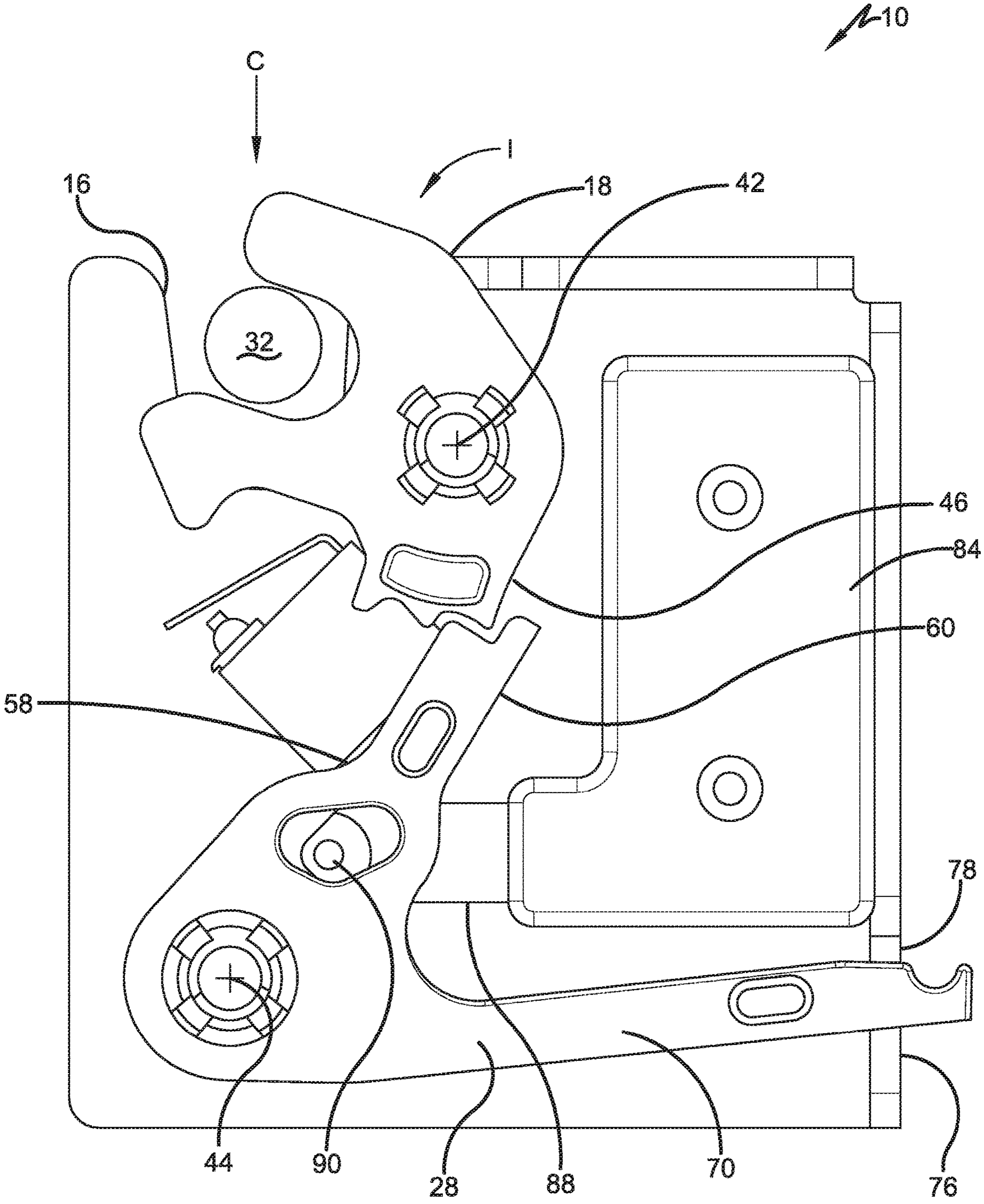
FIG. 9 is a sectional view of the latch showing the internal components of the latch when the striker moves the jaw to a secondary latched position.
Figure 10:
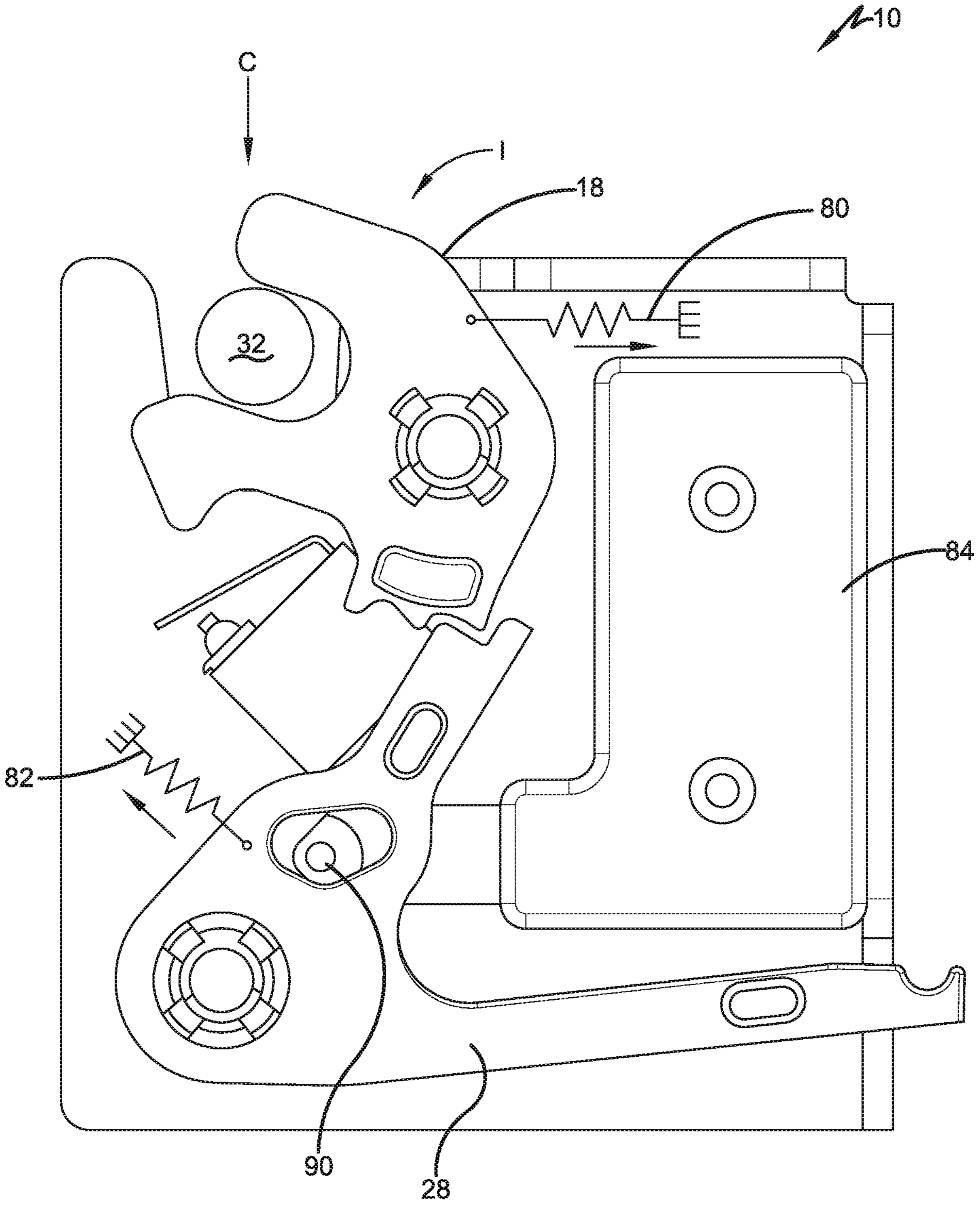
FIG. 10 is a sectional view similar to FIG. 9 that shows schematically the spring forces acting on the jaw and the pawl when the jaw is in the secondary latched position.

When the closure member is to be closed, the striker 32 is again engaged with the jaw 18 by movement into the notch 20. This is represented in FIG. 9 by Arrow C. Movement of the striker 32 into the notch 20 and the recess 16 in the housing is operative to cause the jaw 18 to move from the unlatched position and to rotate counterclockwise as shown in the direction of Arrow I about the jaw pivot 42. In the exemplary arrangement the inner end 46 of the jaw 18 engages the distal end 60 of the first arm portion 58 of the pawl 28. In this secondary latched position of jaw 18 shown in FIG. 9, the interengaging pawl and jaw engagement projections and recesses are operative to engage and act as a ratchet so that the jaw is prevented from moving by the pawl engagement from the secondary latched position shown in FIG. 9 to the jaw unlatched position. However the jaw is enabled to rotationally move from the secondary latched position to the latched position shown in FIG. 11 so as to fully position the striker 32 within the notch 11 and the recess. Such movement of the jaw 18 is enabled by the capability of the distal end 60 of the pawl to move in biased engagement with the inner end 46 of the jaw such that the respective projections and recesses thereon are fully engaged.

As can be appreciated from FIGS. 9 and 11 for example, as the jaw and pawl move as the jaw moves from the secondary latched position to the latched position of the jaw and the engaged position of the pawl respectively, the pin 90 remains stationary. The arm slot 72 moves relative to the pin 90 as the pawl 28 rotates about the pawl pivot 44 as the distal end 60 of the pawl and the inner end 46 of the jaw relatively move in engaged relation. Further as shown in FIG. 11, when the jaw 18 moves to return to the latched position, the jaw switch projection 116 engages with and causes movement of the lever 112 in the direction of Arrow L so that the electrical condition of switch 110 is changed to indicate that the jaw is in the latched position. Of course it should be understood that this arrangement is exemplary and in other arrangements other approaches may be used.

Figure 14:
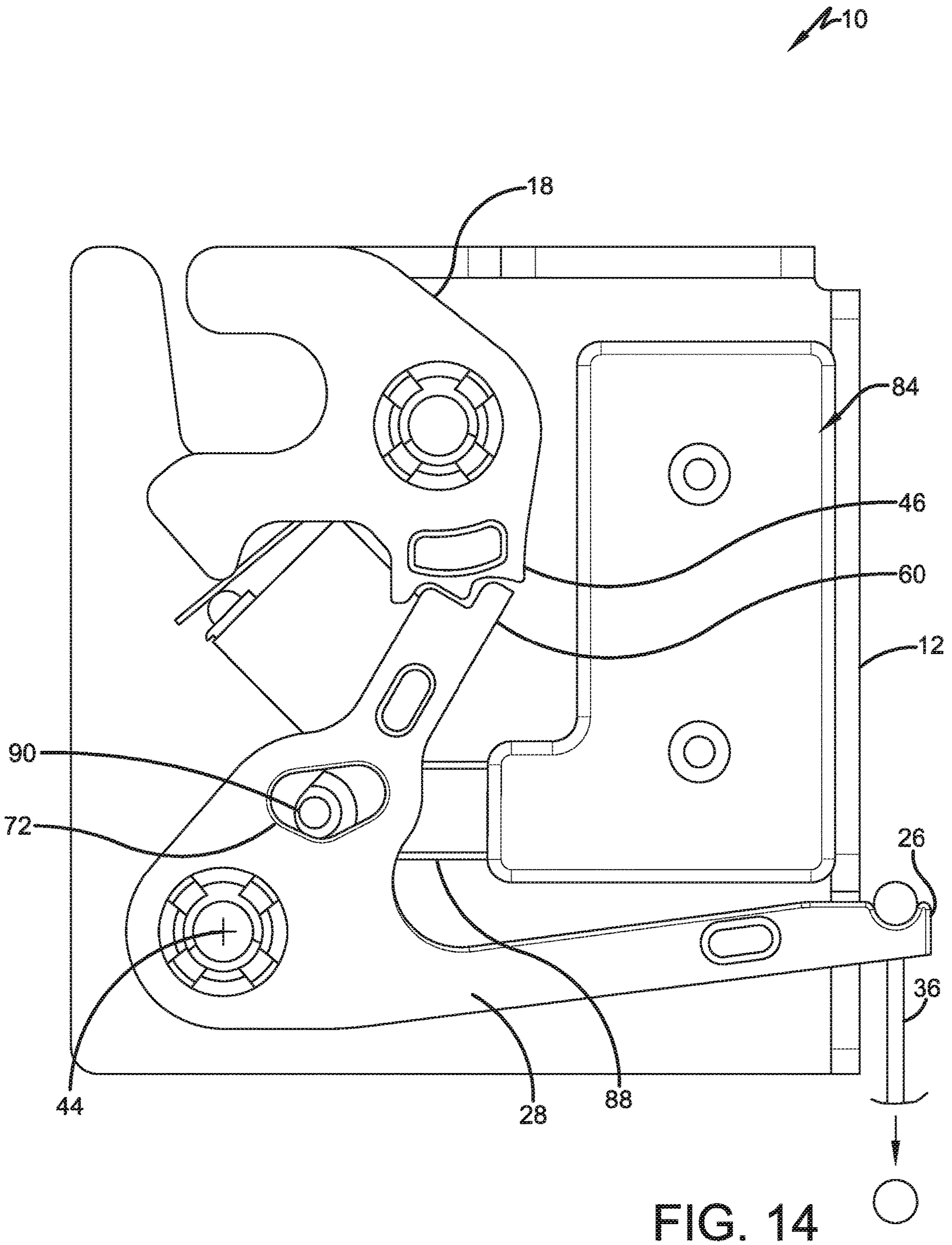
FIG. 14 is a sectional view showing the latch with the jaw in the latched position and movement of the actuating end of the pawl by the cable.
Figure 15:
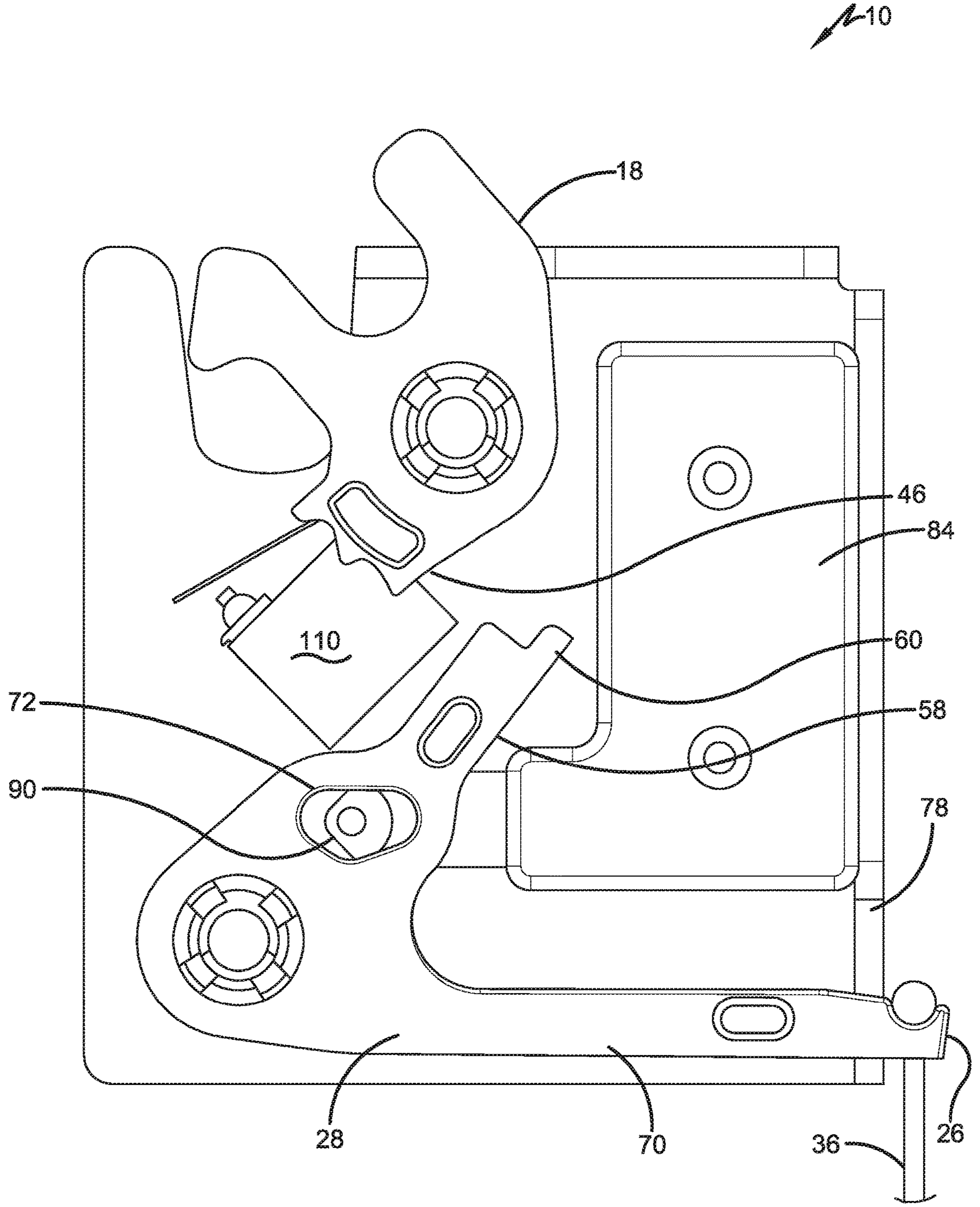
FIG. 15 is a sectional view showing the latch with the pawl moved through operation of the cable to cause the jaw to move to the unlatched position.

FIGS. 14 and 15 further demonstrate how the exemplary latch 10 may be changed from having the jaw 18 in the latched position to having the jaw in the unlatched position responsive to movement of the actuating end of the pawl 28. With the jaw 18 in the latched position as shown and the pawl 28 in the engaged position with the jaw as shown in FIG. 14, the jaw is held in the latched position. In this position the tie rod 88 is positioned by the actuator 84 so that the pin 90 extends in the arm slot 72 and is disposed away from the arm slot sidewall 74 that bounds the arm slot. In this position, movement of the cable 36 in the direction of Arrow O causes the actuating end 26 to move in the opening 76 of the housing 12. The actuating end moves until the second arm portion 70 is in engagement with a transverse wall 118 that bounds opening 76. This movement causes the pawl 28 to rotate in a clockwise direction as shown about the pawl pivot 44.

In the exemplary arrangement because the pin 90 is sufficiently disposed both radially and linearly away from the arm slot sidewall 74, the arm slot 72 is enabled to move relative to the pin unimpeded by engagement of the pin and the side wall. The pin 90 remains stationary as the pawl 28 rotates responsive to movement of the actuating end 26 and the arm slot 72 moves relative to the pin. Movement of the pawl 28 to the disengaged position shown in FIG. 15, causes the distal end 60 of the first arm portion 58 to disengage from the inner end 46 of the jaw 18. This causes the jaw to move responsive to the force of the jaw spring and rotate to the unlatched position.

As can be appreciated, once the cable 36 and the actuating end 26 of the pawl 28 are allowed to move responsive to the force of the pawl spring back toward the position where the second arm portion 70 of the pawl is engaged with the stop 78, the latch is ready to be again engaged with the striker. As the striker is engaged in the notch of the jaw and the jaw returns to the latched position, the latch can again be changed to release the striker and the associated closure member either by the electrical actuator 84 in response to electrical signals or alternatively through mechanical movement of the cable 36. Of course it should be understood that this latch configuration is exemplary and in other arrangements other configurations and structures utilizing the principles discussed herein may be utilized.

FIGS. 16-28 show an alternative arrangement of a latch generally indicated 120. Latch 120 is generally similar to latch 10 previously described except as noted. Latch 120 includes a housing 122. Housing 122 is generally similar to housing 12 previously discussed and in an exemplary arrangement includes side plates which have a recess therein similar to recess 16 previously discussed.

Within the housing 120 is a jaw 124. Jaw 124 includes a notch 126 that is sized for engaging a striker 128 which is shown in phantom in FIG. 17. The jaw 124 is rotatable about a post 130 and a central axis thereof. A pawl 132 that is generally similar to pawl 28 is rotatably movable within the housing about a post 134 and a central axis thereof. Pawl 132 includes a first arm portion 136 and a second arm portion 138. Second arm portion 138 extends through an arm portion opening 140 in the housing and terminates outside the housing at an actuating end 142. The actuating end may include a cable engaging recess or other configuration for engaging an actuating member.

Figure 16:
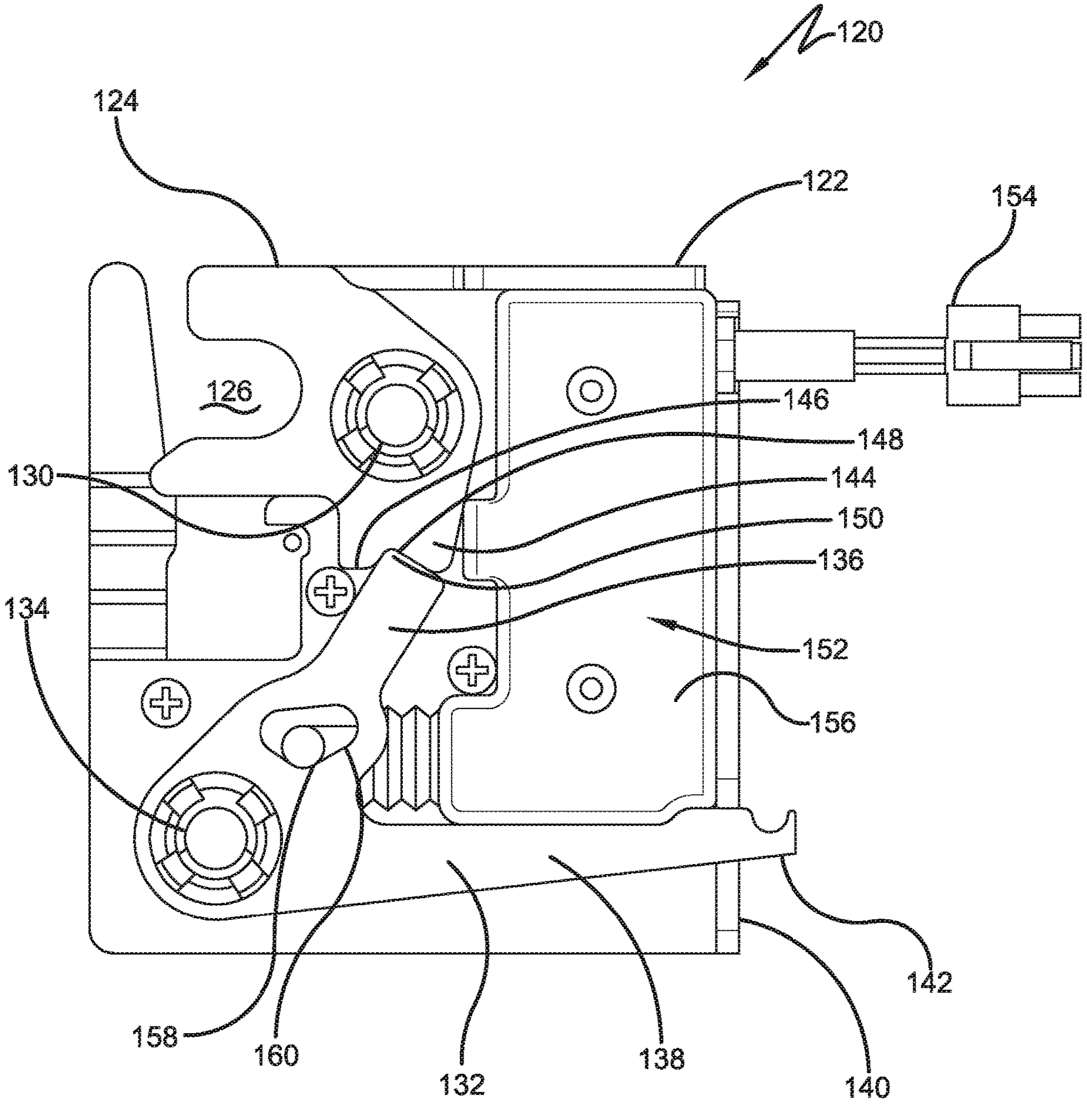
FIG. 16 is a front side sectional view of an alternative latch arrangement shown with the jaw in a latched position.

Jaw 124 includes an inner end 144. The exemplary jaw inner end includes a pair of jaw engagement projections 146 with an intermediate jaw engagement recess 148. The first arm portion 136 of the pawl includes a pawl engagement projection 150. In the latched position of the jaw 124 and the engaged position of the pawl 132 as shown in FIG. 16, the pawl engagement projection 150 is engaged in the jaw engagement recess 148. Such engagement is operative to hold the jaw in the latched position. Further in the exemplary arrangement the jaw is in operative connection with a jaw spring similar to jaw spring 80 of the previously discussed arrangement which is operative to bias the jaw toward the unlatched position. A pawl spring similar to spring 82 is operative to bias the first arm portion 136 of the pawl toward the engaged position as shown in FIG. 16.

It should be appreciated that the exemplary arrangement shown in FIG. 16 is a latch that is of a single stage type that only has conditions in which the jaw is either in the fully latched position or the unlatched position. In this exemplary arrangement there is no intermediate position in which the jaw is held. However it should be understood that other arrangements may include an arrangement of jaw projections and recesses and pawl projections and recesses that are operable to enable holding the jaw in an intermediate position in engagement with the striker in a manner like that previously discussed.

Latch 120 includes an electric actuator 152. Electrical connector 154 is in operative connection with the electric actuator and extends outside the housing 122. The actuator includes a case 156. The exemplary actuator includes a cam follower as later discussed, that operatively extends outside the housing and is operatively connected to a pin 158. Similar to pin 90, pin 158 is selectively movable along a linearly straight actuating direction responsive to operation of the actuator 152.

Arm portion 136 of pawl 132 includes an arm slot or opening 160. Arm slot 160 is positioned radially intermediate of the axis of the post 134 about which the pawl rotates and the distal end of first arm portion 136. Opening/arm slot 160 is bounded by arm slot sidewall 162. Arm slot 160 is elongated both in the linear actuating direction of travel of pin 158 responsive to the actuator 152, as well as transversely of the actuating direction of pin travel. This enables the pawl 132 to be rotatably moved responsive to movement of the actuating end 142 without pin 160 interfering with such pawl movement.

Figure 17:
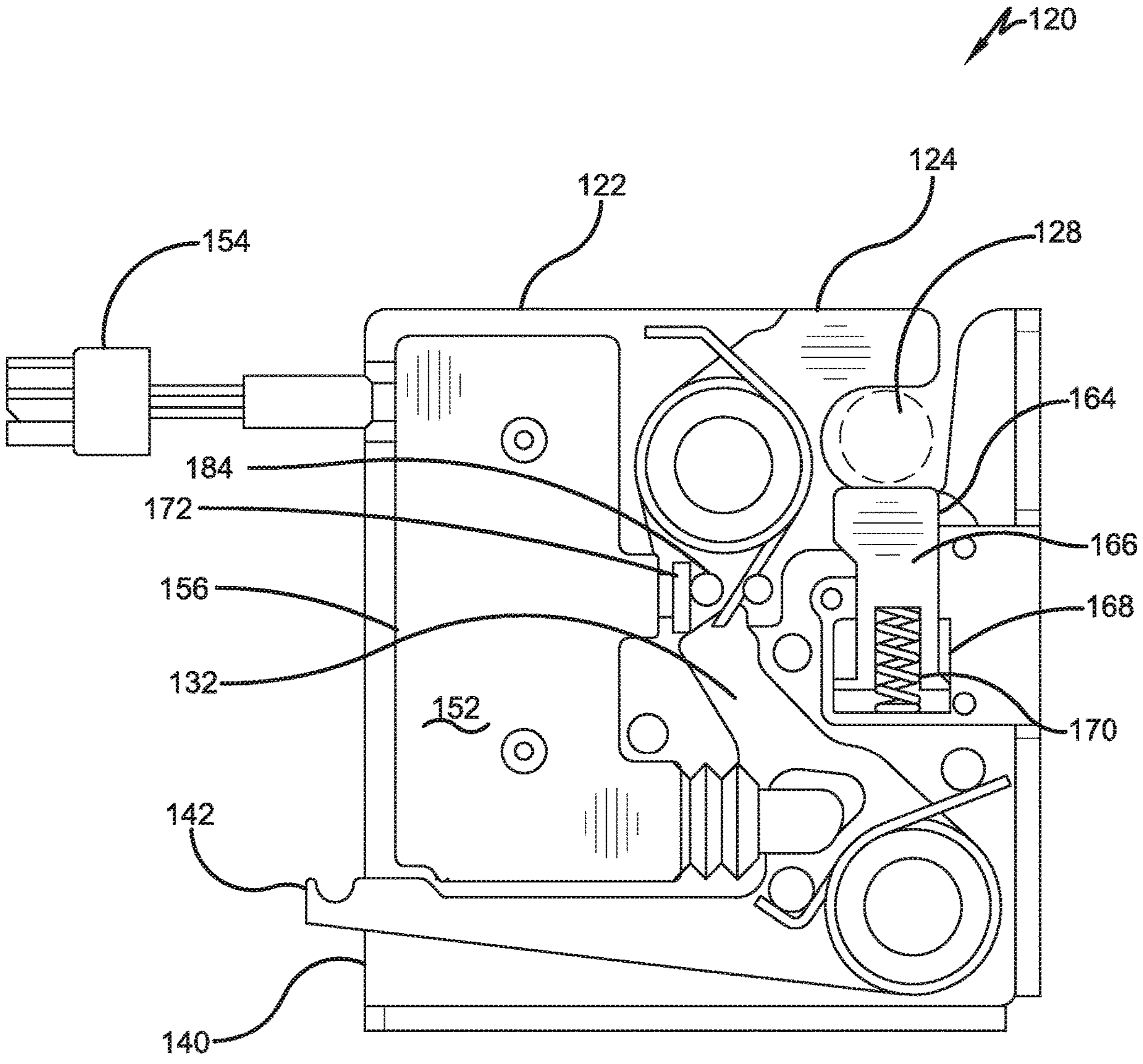
FIG. 17 is a back side sectional view of the alternative latch shown in FIG. 16.

As shown in FIG. 17 latch 120 further includes a plunger 164. Plunger 164 includes a plunger body 166 that is movable along a linear direction in guided relation within a plunger guide 168. The plunger 164 further includes a compression spring 170. The compression spring biases the plunger body 166 outwardly relative to the recess in the housing 122.

Figure 20:
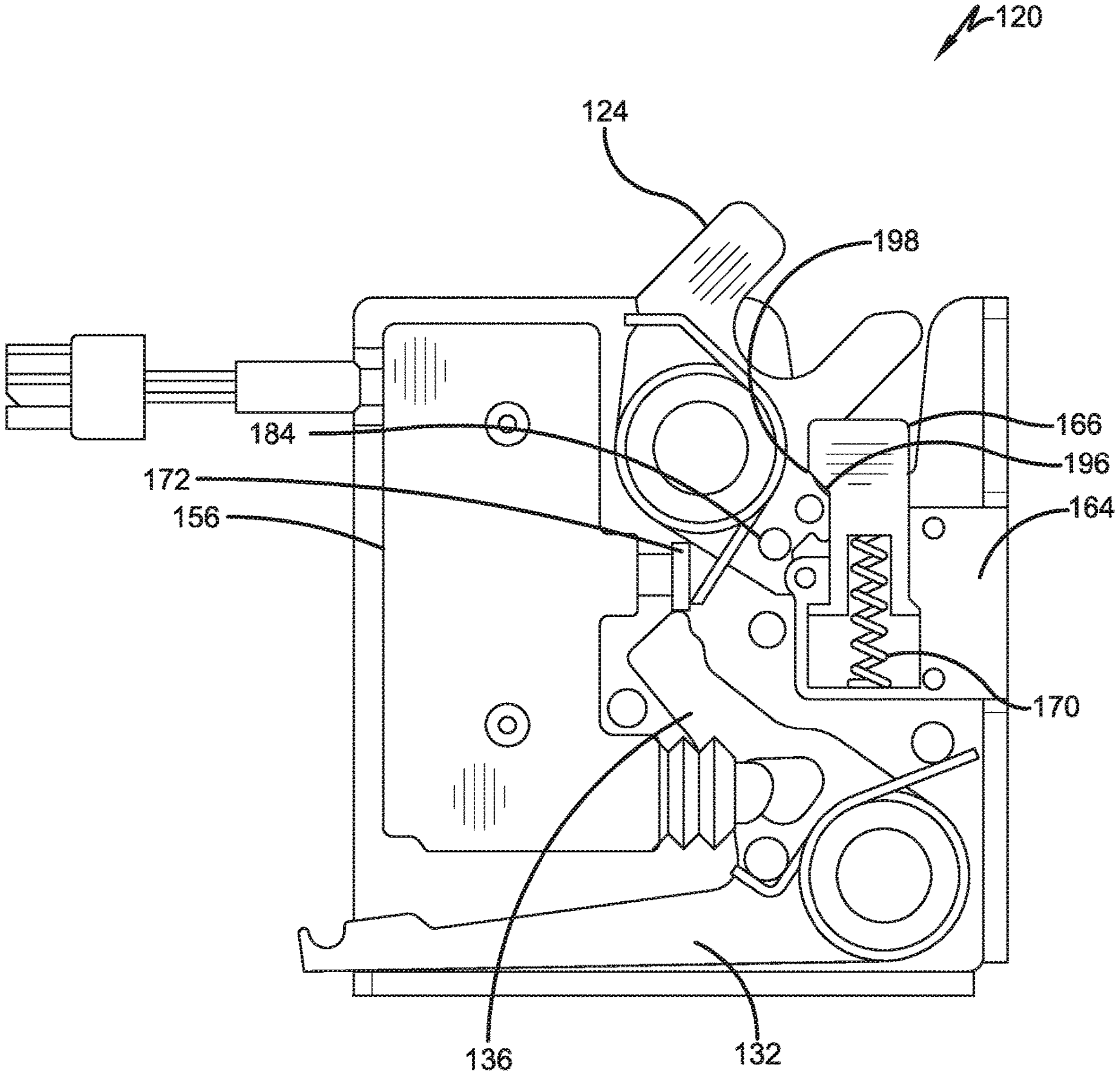
FIG. 20 is a back side sectional view of the alternative latch as shown in FIG. 19.
Figure 21:
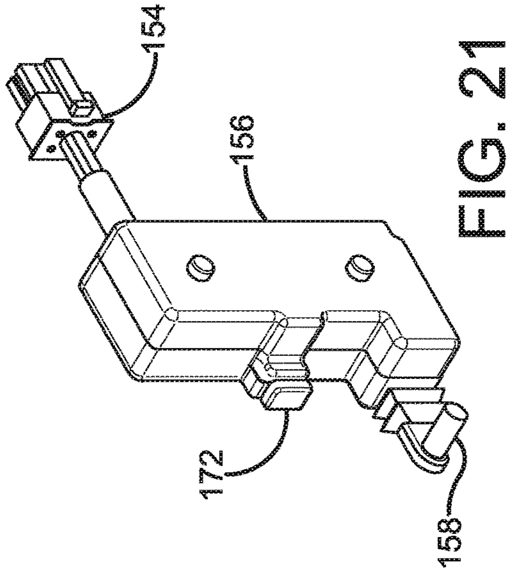
FIG. 21 is a top right perspective view of the electrical actuator shown in the latch of FIGS. 16-20 with the cam follower thereof extended.
Figure 22:
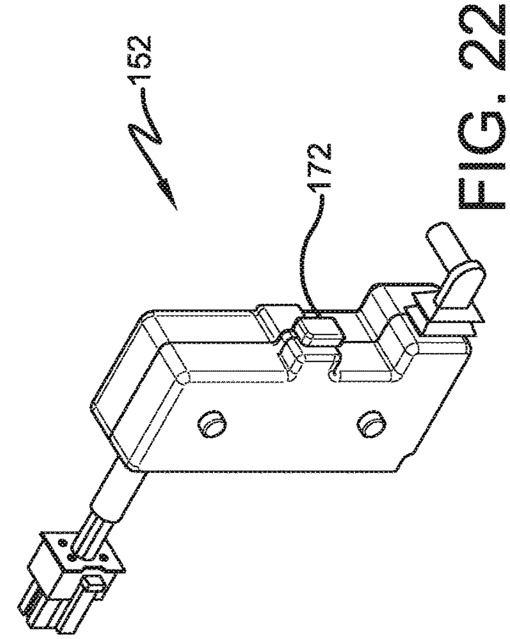
FIG. 22 is a top left perspective view of the electrical actuator shown in FIG. 21.
Figure 23:
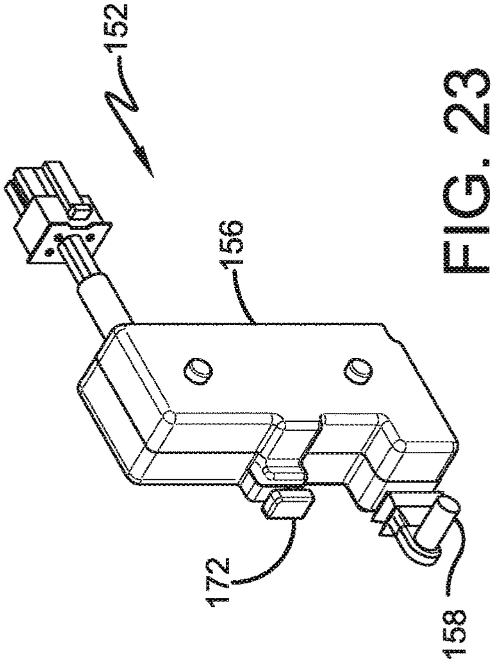
FIG. 23 is a top right perspective view of the electrical actuator shown in FIG. 21 with the cam follower thereof retracted.
Figure 24:
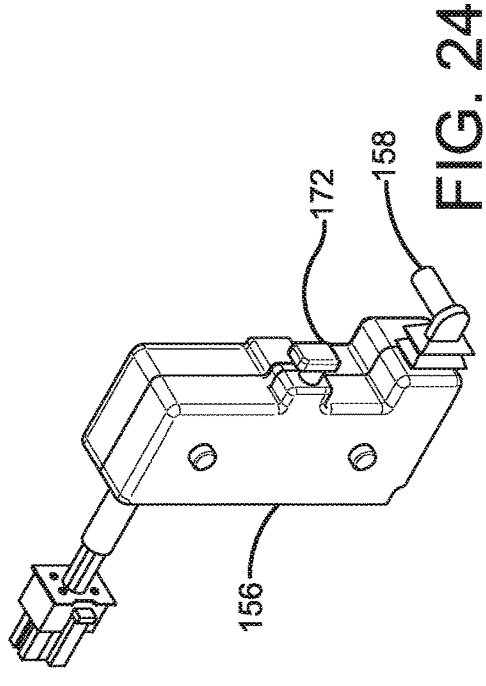
FIG. 24 is a top left perspective view of the electrical actuator shown in FIG. 23.

In the exemplary arrangement the plunger body 166 is in adjacent relation to the jaw 124. When the jaw 124 is in the latched position and in engagement with the striker 128, the plunger body is in abutting engagement with the striker. As shown in FIG. 20 when the pawl 132 rotates to enable the jaw 124 to move to the unlatched position, the plunger body 166 moves outward responsive to the biasing force of the spring 170 and helps to urge the striker 128 to disengage from the jaw 124 and the latch 120. As can be appreciated the plunger 164 acts to supplement the biasing force provided by the jaw spring to assist in releasing the striker when the pawl disengages the jaw and the latch is opened. When the striker is to be again engaged with the jaw 124, the striker engages the plunger body 166 as the jaw is moved from the unlatched position shown in FIG. 20 toward the latched position shown in FIG. 16. The plunger body 166 is moved against the force of the compression spring 170 through engagement with the striker so as to return the plunger to the initial position shown in FIGS. 16 and 17. Of course it should be understood that this configuration is exemplary and other arrangements other approaches may be used.

The exemplary case 156 of the electric actuator 152 also includes an integral electrical switch that is operative to electrically indicate the position of the jaw 124. As shown in FIGS. 21-28 a movable lever piece 172 extends outside the case 156. As shown in FIGS. 25-28 lever piece 172 includes a stem 174 and an enlarged head 176. The stem 174 is movable in an opening that extends through the case. The stem includes an inner end 178. The inner end 178 engages a movable actuator plate 180. The actuator plate is biased by springs 182 or other biasing members to urge the stem 174 and the lever piece 172 to extend outward from the case.

Figure 26:
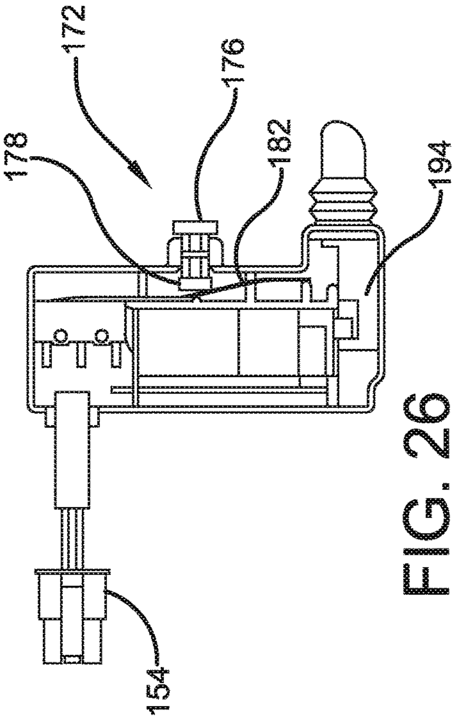
FIG. 26 is a left side sectional view of the actuator shown in FIG. 21.
Figure 28:
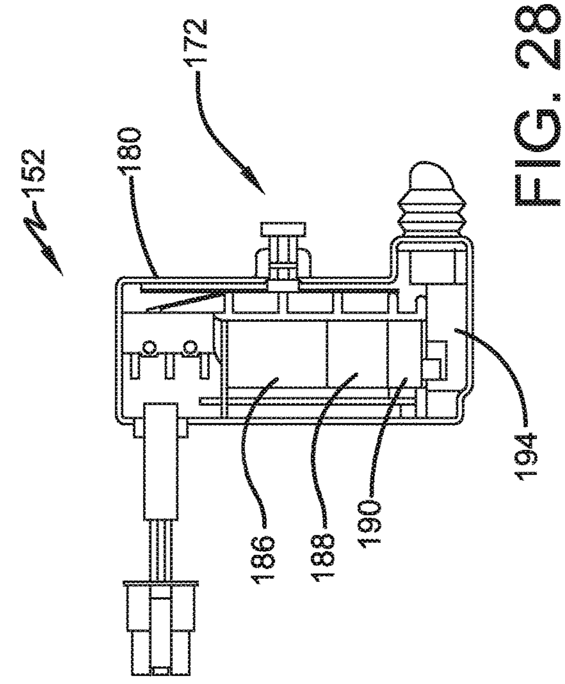
FIG. 28 is a left side sectional view of the actuator shown in FIG. 23.
Figure 25:
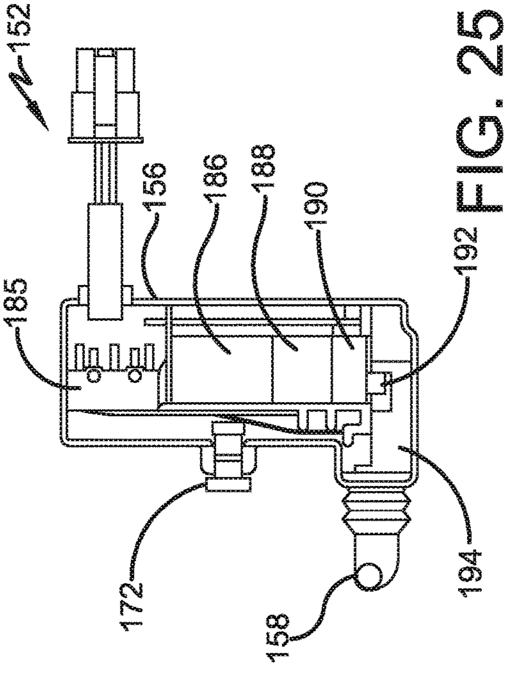
FIG. 25 is a right side sectional view of the actuator shown in FIG. 21.
Figure 27:
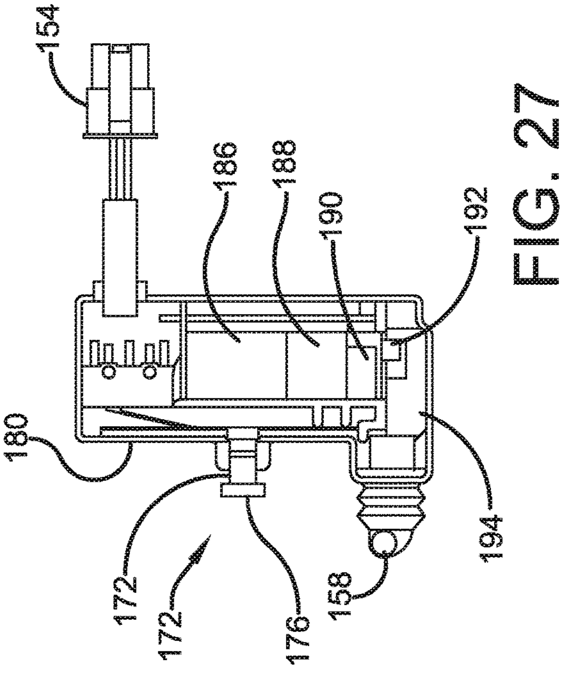
FIG. 27 is a right side sectional view of the actuator shown in FIG. 23.
Figure 29:
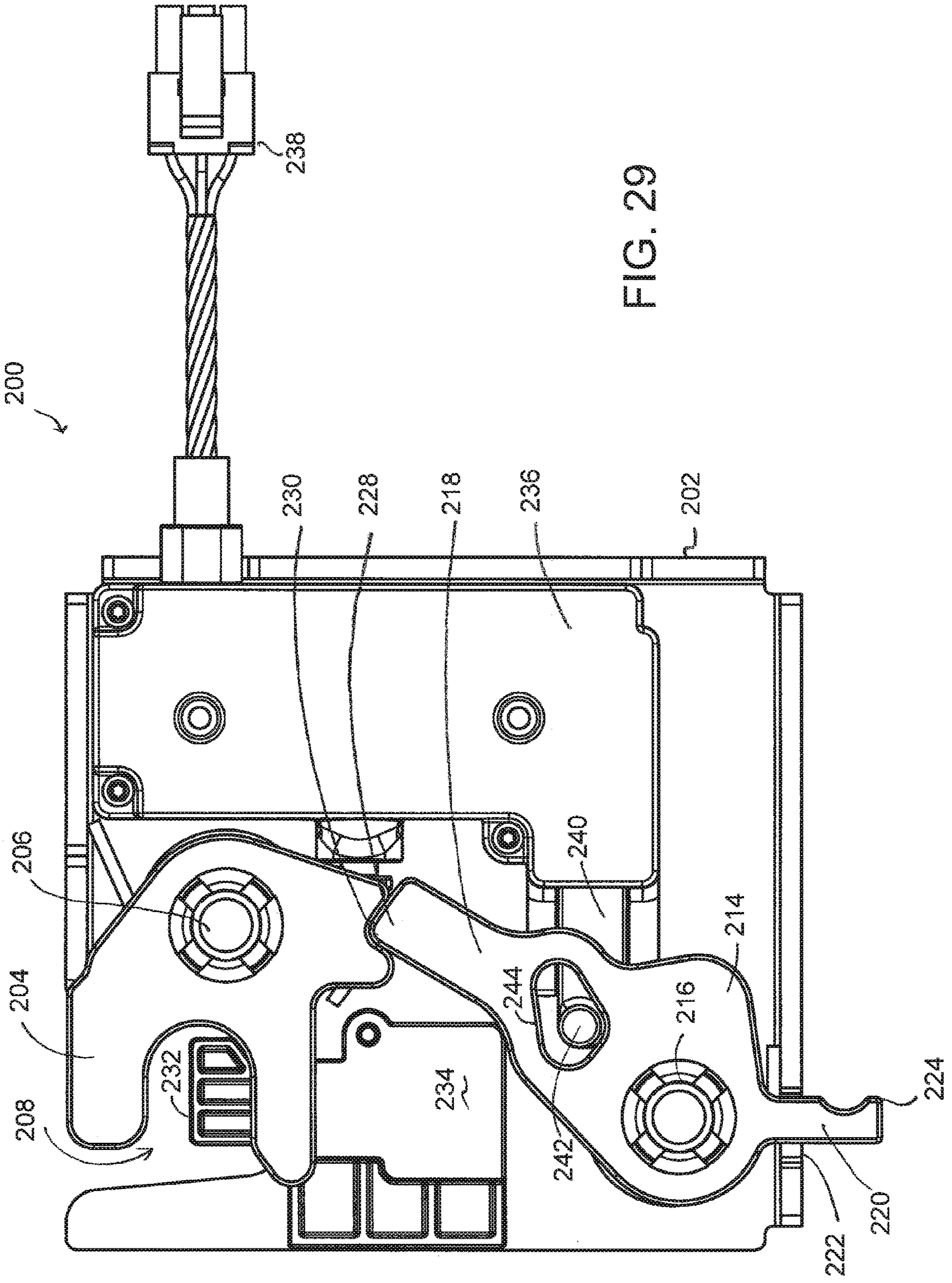
FIG. 29 is a front side sectional view of a further alternative latch arrangement with the jaw shown in the latched position.
Figure 30:
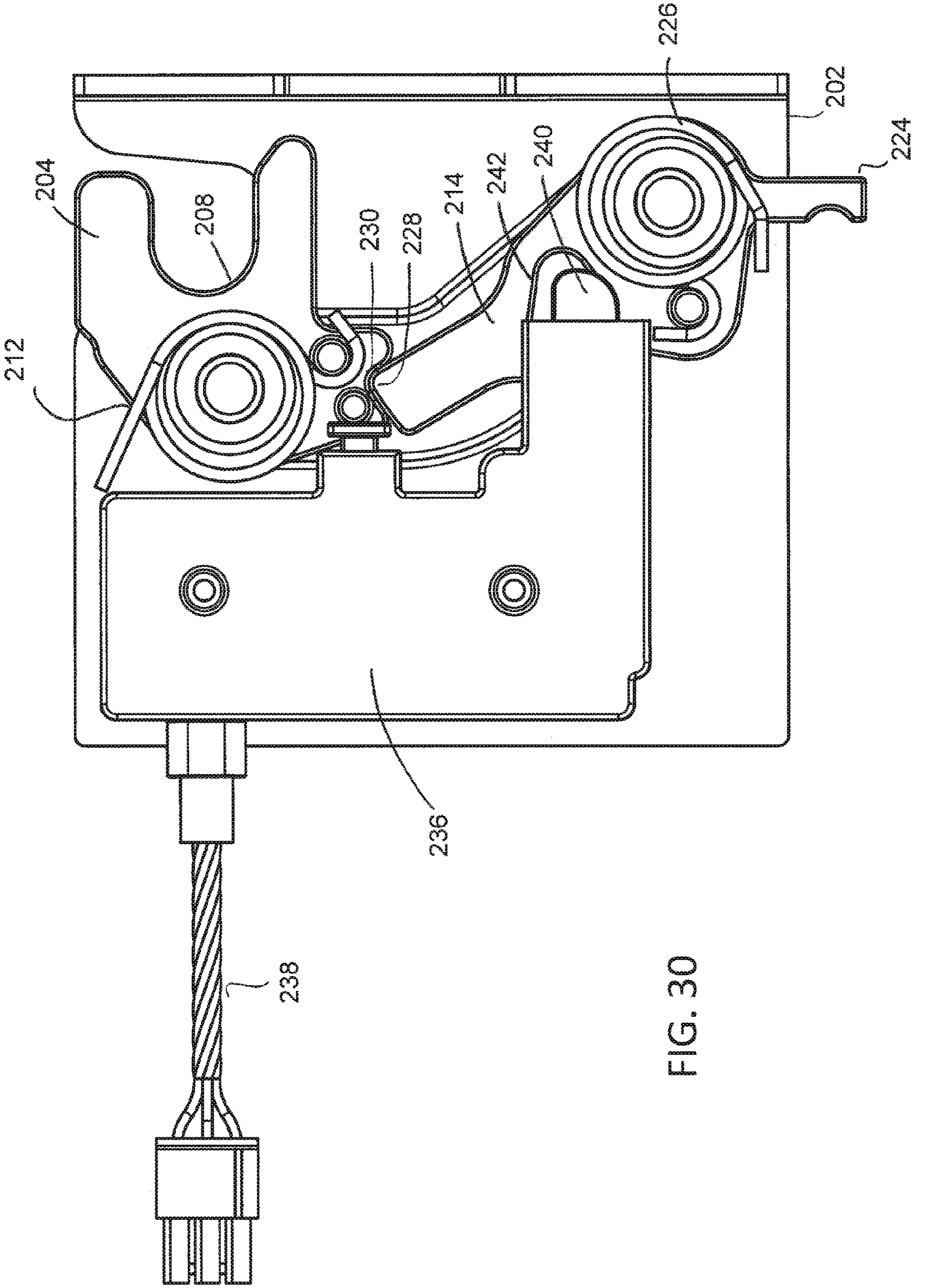
FIG. 30 is a back side sectional view of the latch shown in FIG. 29

A switch 185 is positioned within the case 156. The switch 184 includes an actuator which moves and changes the electrical condition of the switch responsive to the position of the lever piece and the actuator plate 180. FIGS. 25 and 26 show the lever piece 172 disposed inwardly on the case against the biasing force of the springs 182. FIGS. 27 and 28 show the lever piece 182 disposed at a position extending outward on the case. Of course it should be understood that this configuration is exemplary and in other arrangements other approaches may be used.

As shown in FIG. 17 in the exemplary arrangement the jaw 124 includes a jaw switch projection 184 that extends from a surface thereof. In the latched position of the jaw 124 the jaw switch projection 184 engages the lever piece 172 and causes the lever piece to be disposed inwardly on the case 156 of the actuator 152. This causes the switch 185 to be in a first electrical condition. When the jaw 124 moves to the unlatched position as shown in FIG. 20, the jaw switch projection 184 is disposed away from the lever piece 172. The lever piece 172 moves and extends further outwardly on the case 156 and causes a change in the electrical condition of the switch 185. This enables the switch 185 to provide electrical signals that are indicative of the position of the jaw 124 as well as whether the latch is in the latched or unlatched condition. Of course it should be understood that this arrangement is exemplary and other arrangements for sensing the condition of the latch may be used.

The exemplary actuator 152 includes within the case thereof an electric motor 186. The electric motor 186 includes an output shaft or similar rotating member that rotates when electrical power is supplied to the electric motor. The exemplary electric motor is in operative connection with a gearbox 188. The gearbox operates to receive rotational motion via an output shaft of the motor or other rotating member at the speed provided by the electric motor and to provide rotational motion of an output shaft or other output member of the gearbox at a speed that is lower than the input speed provided by the motor.

The gearbox 188 is in operative connection with a rotatable cam 190. Cam 190 includes an eccentric cam lobe 192. The cam 190 rotates responsive to rotational motion from the motor that is transmitted through the gearbox. As the cam rotates the lobe moves rotationally with the cam. A cam follower 194 is movable in operative engagement with the cam lobe 192. The cam follower 194 is operatively connected to the pin 158. The cam follower 194 is positioned within the case so that it is guided to move linearly along a straight line in the actuation direction back-and-forth responsive to the position of the cam lobe 192.

As represented in FIGS. 25 and 26 with the cam lobe 192 positioned as shown, the pin 158 is positioned at the furthest outward extent of its travel relative to the case 156 of the electric actuator. As the cam 90 rotates responsive to the electric motor and the gearbox, the cam lobe 192 moves to the position shown in FIGS. 27 and 28. In this position the pin 158 is retracted to the furthest inward extent of travel along the actuation direction relative to the case. Thus as can be appreciated, operation of the motor 186 causes the pin to move linearly straight along the actuation direction inward and outward relative to the case of the actuator 152. As a result in this exemplary arrangement the pin may be moved between the extended and retracted positions through movement of the motor in only one rotational direction. This avoids the need to reverse the direction of the motor as is done to move the rack in the previously described arrangement. The use of the exemplary cam arrangement may also avoid the need for bumpers or other structures to limit the extremes of travel of the structures which operatively move the pin. Of course it should be understood that the arrangements described herein are exemplary and in other arrangements other configurations may be used.

Figure 18:
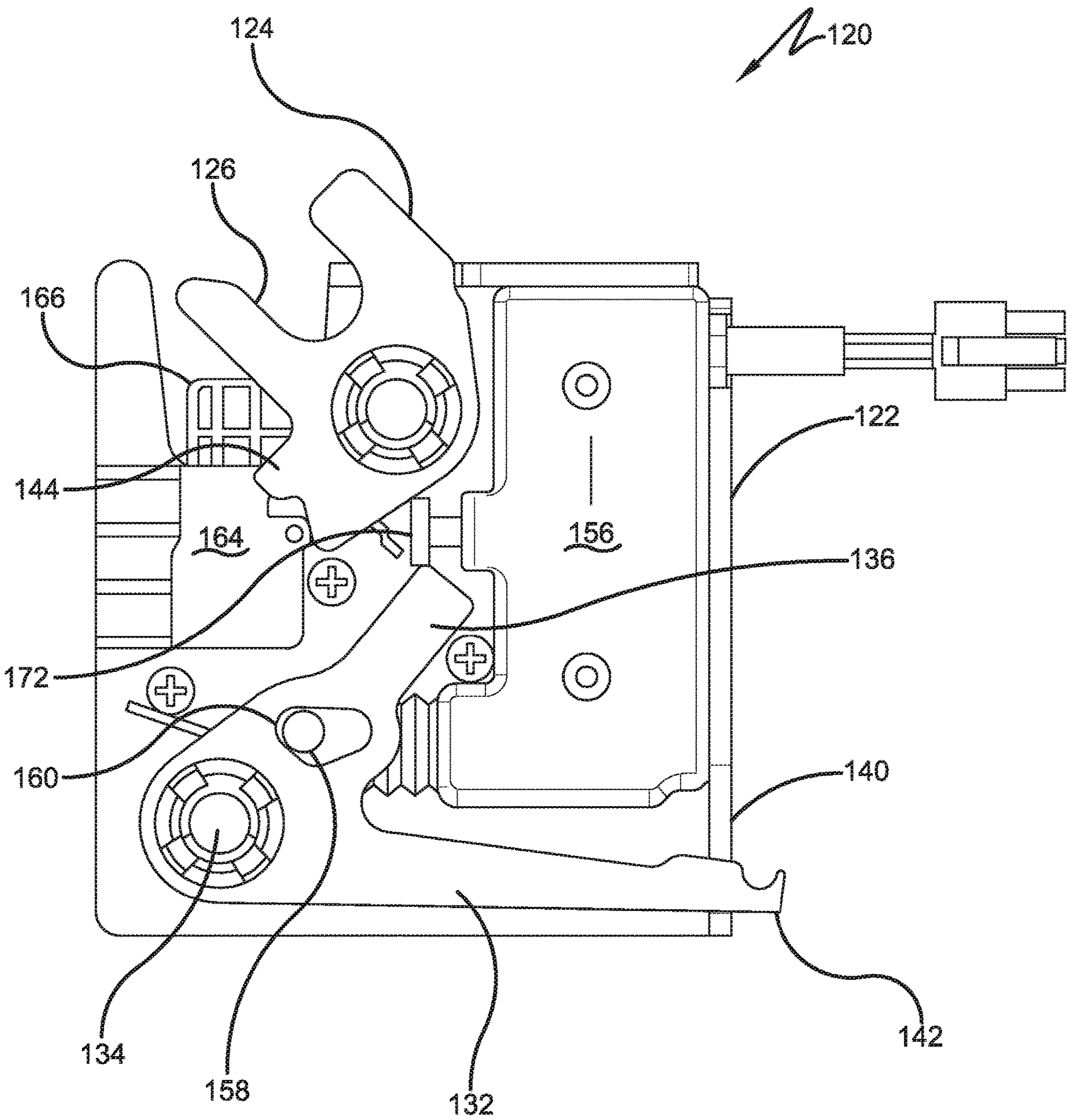
FIG. 18 is a front side sectional view of the latch shown in FIG. 16 with the jaw moved to the unlatched position responsive to movement of the actuating end of the second arm portion of the pawl.

An exemplary arrangement of latch 120 is shown in FIGS. 16 and 17 with the jaw 124 in the latched position in engagement with the striker 128. In this position a closure member that is in operative connection with the striker is held in a fixed position in response to the engagement of the striker with the latch. To change the latch so the jaw 124 is movable to the unlatched position, the pawl 132 is rotated such that the distal end of the first arm portion 136 is disengaged from the jaw inner end 144. FIG. 18 shows the pawl rotated to disengage from the jaw 124 by movement of the actuating end 142 in the arm portion opening 140 of the housing 122 of the latch. The disengagement of the pawl with the jaw causes the jaw to rotate to the unlatched position as shown in FIG. 18. The plunger body 166 also moves responsive to the biasing force of the compression spring 170 to help to disengage the striker from the notch 126 of the jaw.

Also as shown in FIG. 18, as the jaw 124 moves from the latched position to the unlatched position the lever piece 172 is enabled to move outward on the actuator case 156 so that the change in the condition of the latch can be indicated by the switch 185. Also as represented in FIG. 18 the pin 158 remains stationary while the arm slot 160 and the pawl 132 relatively move with respect to the pin. As a result the pin 158 does not interfere with the movement of the pawl 132 to unlatched the latch responsive to movement of the actuating end 142.

Figure 19:
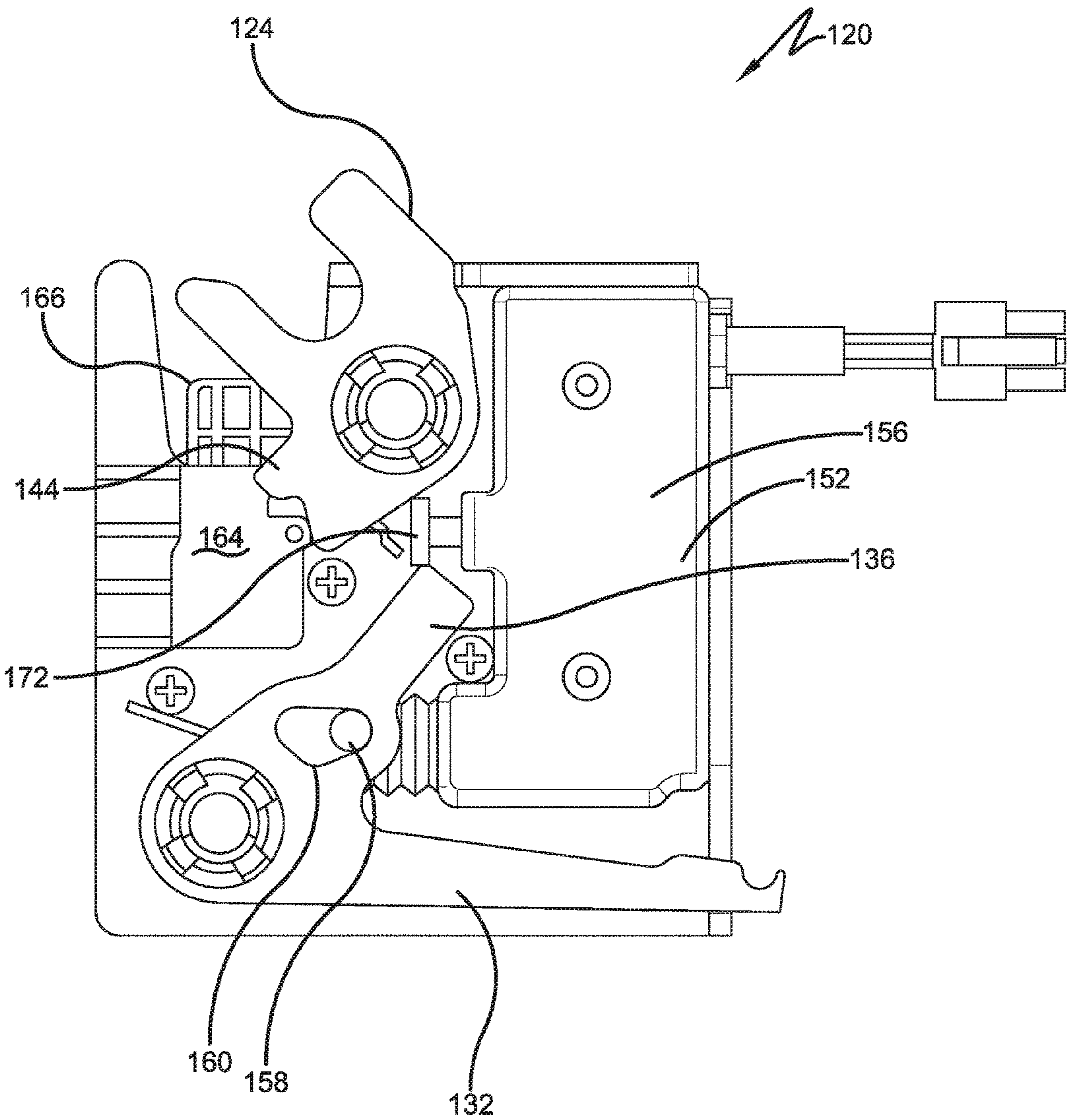
FIG. 19 is a front side sectional view of the latch shown in FIG. 16 with the jaw moved to the unlatched position responsive to the electrical actuator.

FIG. 19 shows the manner in which the condition of the latch 120 may be changed from the latched condition to the unlatched condition responsive to the electric actuator 152. As shown in FIG. 19, the pin 158 is moved by the cam follower 194 to engage the wall of the slot 160 and to rotate the pawl 132. Such movement causes the distal end of the first arm portion 136 to disengage from the jaw inner end 144. Jaw 124 is enabled to rotate from the latched position shown in FIG. 16 to the unlatched position shown in FIG. 19 so that the striker can be disengaged from the jaw. The plunger body 166 of the plunger 164 biasingly extends to further urge the striker out of the notch in the jaw and the recess in the housing of the latch so that the striker can be disengaged from the latch. The extension of the plunger body 166 is further shown in FIG. 20.

Also in the exemplary arrangement, the jaw 124 includes a stop projection 196. The stop projection 196 is configured to engage the extended plunger body 166 so as to limit the rotational movement of the jaw 124 to the unlatched position. The exemplary plunger body 166 further includes a step 198 to further facilitate the engagement of the stop projection with the plunger body and limit the extent of rotational travel of the jaw. Of course this approach is exemplary and in other arrangements other approaches may be used. Also as represented in FIGS. 19 and 20 the lever piece 172 is enabled to extend further outward on the case 156 in response to the jaw switch projection 184 moving so as to be disposed away therefrom. As a result the change in the condition of the latch from the latched condition to the unlatched condition is enabled to be detected by the change in the electrical condition of the switch 185.

The alternative latch 120 includes an integrated actuator and electrical switch. The actuator can be operated to change the condition of the latch from the latched condition to the unlatched condition responsive to the delivery of electrical power thereto, and also provide an electrical indication of the change in the latch condition. The exemplary latch further enables the latch to be changed from the latched condition to the unlatched condition without using the electric actuator, by mechanical movement of the pawl via the actuating end which extends outside the housing of the latch. This further provides the alternative of unlatching the latch through a mechanical connection. Of course it should be understood that these configurations and components that make up the exemplary latch may be used in other latch arrangements, including those that may provide for only electrical control of the latch or only mechanical control of the latch. In addition the features described may be implemented in connection with latches that use other structures for engaging a striker or a similar latching member that is selectively held and released through operation of the latch.

Figure 31:
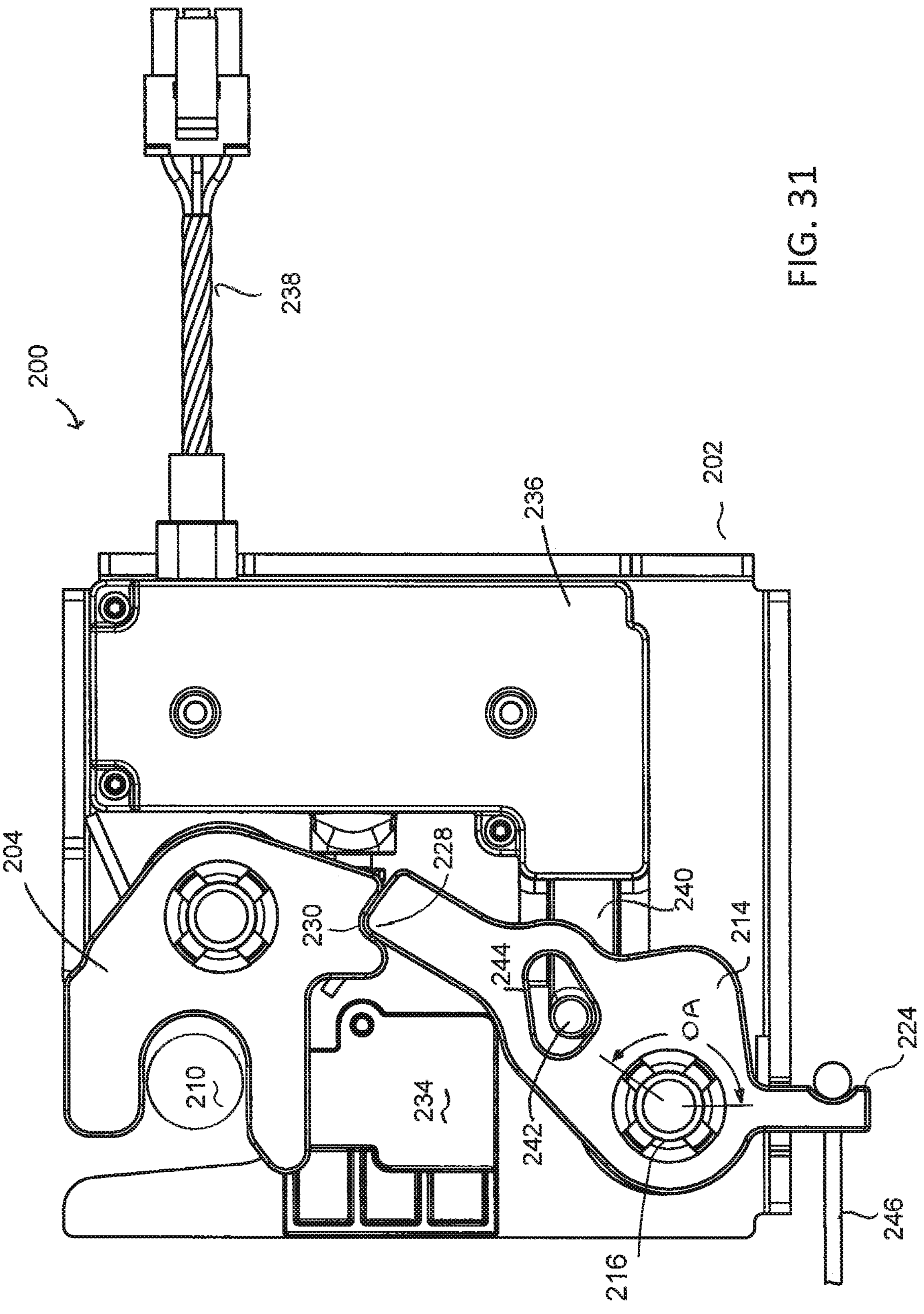
FIG. 31 is a front side sectional view of the latch shown in FIG. 29 with the pawl in engagement with a cable.

FIGS. 29 through 34 show an alternative exemplary arrangement of a latch 200. The exemplary latch 200 is similar to latch 120 except as otherwise described. Latch 200 includes a housing 202 that houses a jaw 204 which is rotatable about a central axis of a post 206. The jaw includes a notch 208 that is configured for engaging a striker 210 in the latched position as shown in FIG. 31. The exemplary jaw is biased by a jaw spring 212 toward the unlatched position.

Latch 200 further includes a pawl 214. Pawl 214 is rotatable about a central axis of a post 216. Pawl 214 includes a first arm portion 218 and a second arm portion 220. The first arm portion and the second arm portion are angularly spaced apart. In this alternative arrangement the second arm portion 220 extends at an obtuse angle OA (see FIG. 31) relative to the first arm portion. The housing includes an arm portion opening 222 through which an actuating end 224 of the pawl 214 extends. Actuating end 224 may be configured to engage a cable. As used herein a cable shall be deemed to include a cable, a rod, a lever or other suitable actuating member. Pawl 214 is in operative connection with a pawl spring 226. Pawl spring 226 is operative to bias the pawl 214 in a rotational direction that is opposite to the rotational direction in which the jaw 204 is biased by the jaw spring 212.

Figure 34:
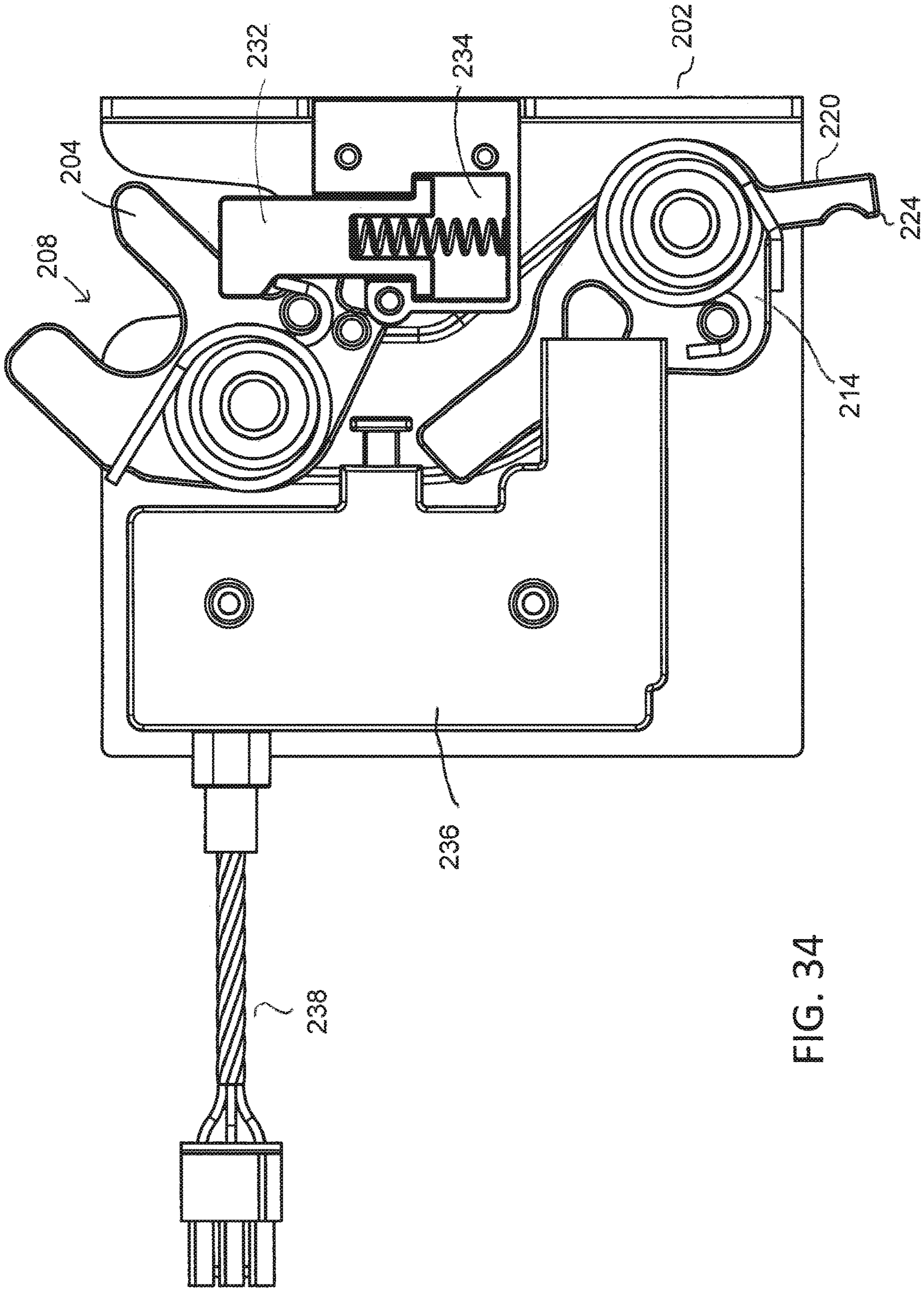
FIG. 34 is a back side sectional view of the latch showing a plunger which acts to release the striker from engagement with the jaw, in an extended position.

Similar to the pawl of latch 120, pawl 214 includes a pawl engagement projection 228. The pawl engagement projection is configured to engage a jaw engagement recess 230 of the jaw. Engagement of the pawl engagement projection 228 and the jaw engagement recess 230 is operative to hold the jaw 204 in the latched position. The exemplary latch further includes a spring-loaded plunger 232 that is mounted in movable biased engagement with a plunger body 234. The plunger operates in a manner similar to plunger 164 described in connection with latch 120 to further bias the striker to disengage from the jaw when the jaw is moved from the latched position shown in FIG. 29 to the unlatched position as shown in FIGS. 32 and 34.

Latch 200 further includes an electrical actuator 236. Electrical actuator 236 may be similar to the electrical actuators 152 or 84 that have been previously described. The electrical actuator includes an electrical connector 238 that extends outside the housing 202 and is configured to be in connection with an electrical wiring harness. Similar to the other actuators, actuator 236 includes a linearly movable tie rod 240 or similar structure that is selectively movable inward and outward from the actuator 236 responsive to operation thereof. The exemplary tie rod is in operative connection with a transversely extending pin 242. The pin is engaged in an opening 244 that extends in the arm portion 218. The opening 244 is alternatively referred to herein as an arm slot. The exemplary arm slot 244 is configured so as to enable the pawl 214 to rotate about the pawl pivot that is centered at the axis of post 216 in a clockwise direction from the position shown in FIG. 29 while the pin 242 remains stationary within the slot. This enables the latch to be unlatched responsive to either the actuator or movement of the actuating end of the pawl.

In the exemplary arrangement of latch 200 in which the pawl 214 includes a second arm portion 220 that is disposed at an obtuse angle from the first arm portion 218, the actuating end 224 of the pawl extends from the housing on a different side of the housing from the actuating ends of the pawls in the previously described arrangements. Thus as shown for example in FIG. 31, a cable 246 or other actuating mechanism may be engaged with the actuating end 224 in a different location relative to the housing 202 compared to the other exemplary arrangements. Further as can be appreciated from FIG. 32, the movement of the cable 246 may be in a direction that is substantially transverse to the direction of movement of the cable or other actuating structure that moves the actuating end of the pawl in other described latch arrangements. This exemplary configuration provides additional types of mechanical actuating options for the latch 200 compared to the other exemplary latch arrangements.

Figure 32:
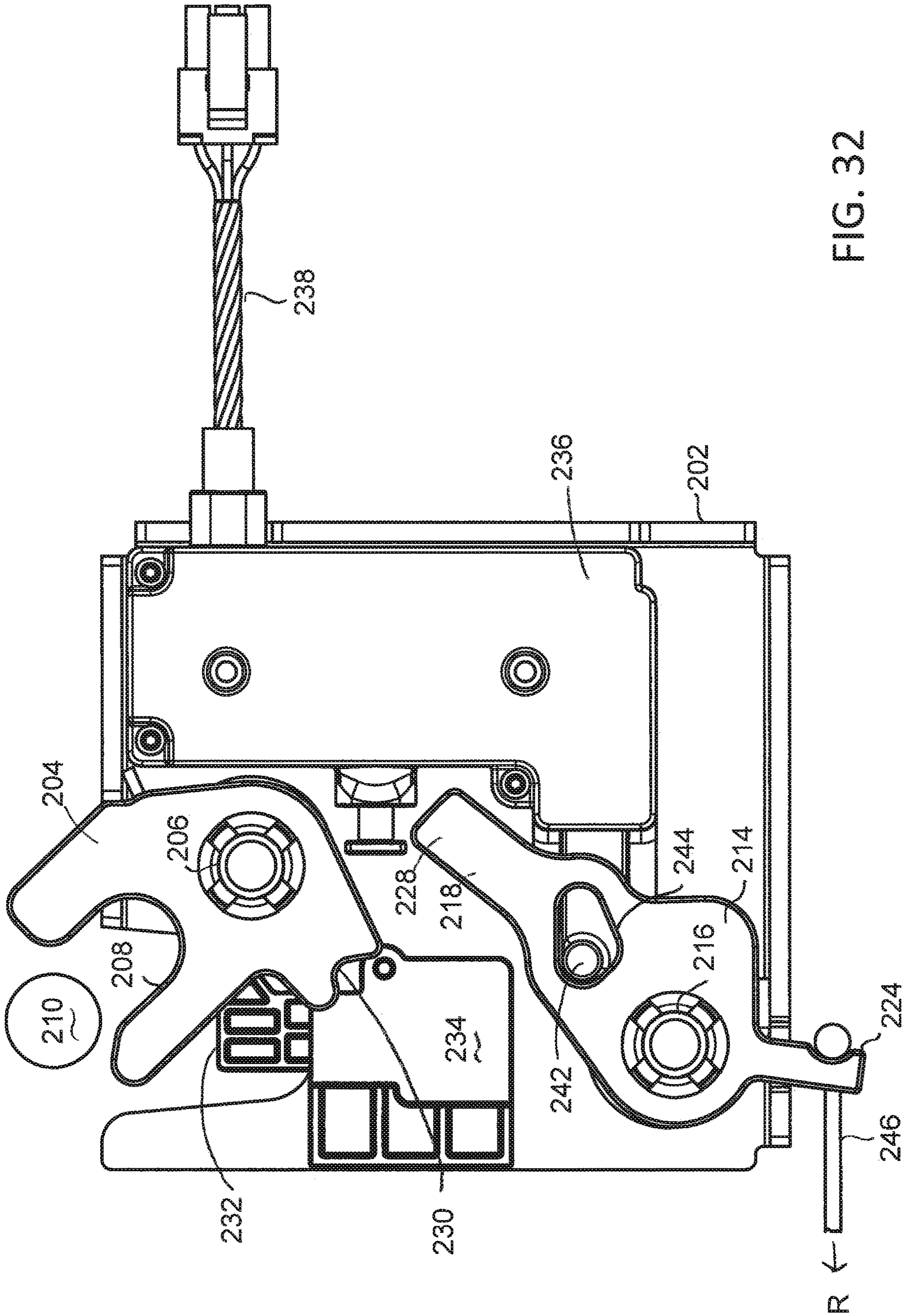
FIG. 32 is a view similar to FIG. 31 but with the latch changed to the unlatched condition responsive to movement of the cable.
Figure 33:
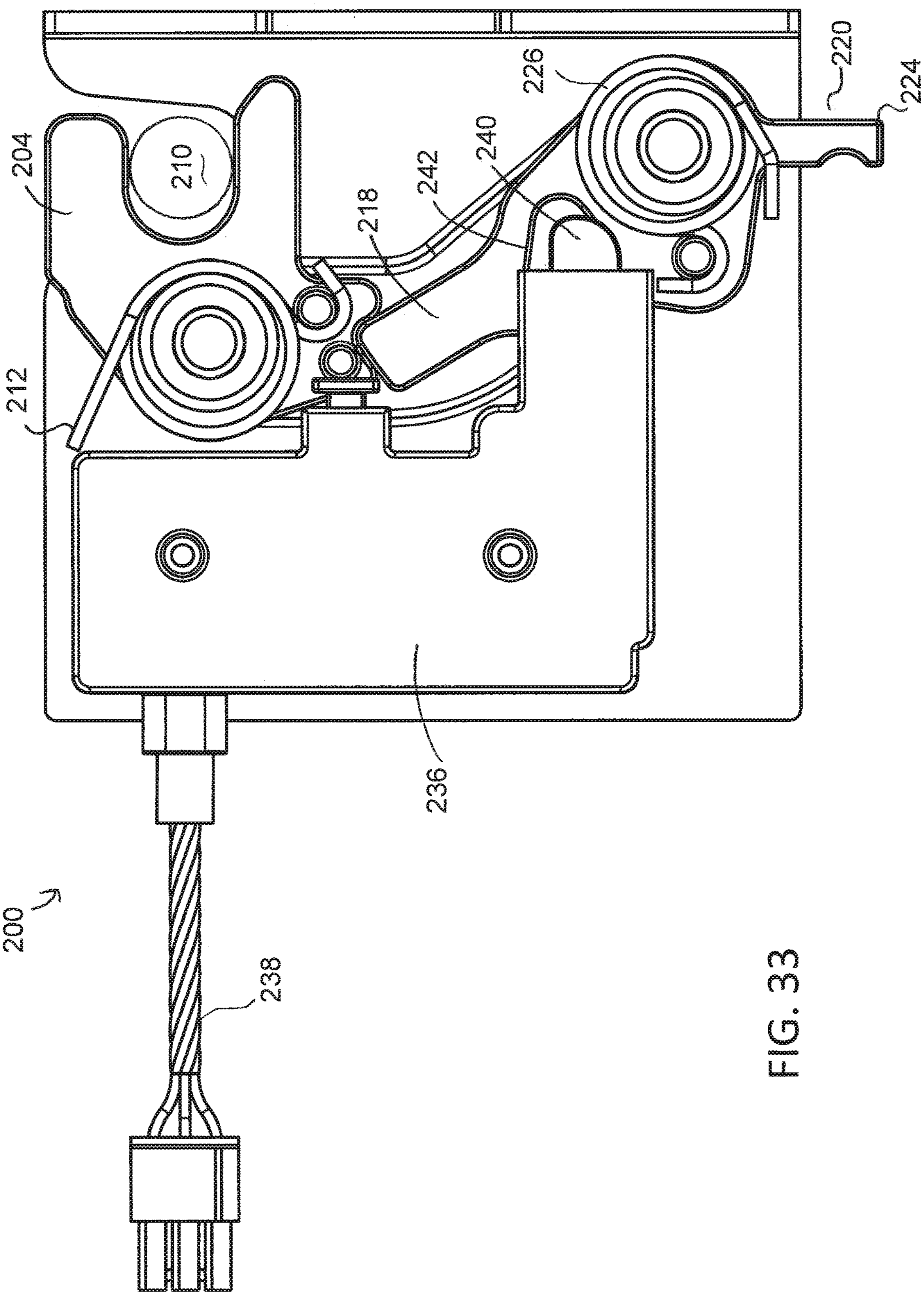
FIG. 33 is a back side sectional view of the latch shown in the latched position and with the jaw in engagement with a striker.

As can be appreciated, from the latched position of the jaw 204 shown in engagement with the striker 210 in FIG. 31, movement of the cable 246 in the direction of Arrow R in FIG. 32 rotates pawl 214 in a clockwise direction about the pawl pivot and the post 216. Such movement by the first arm portion 218 of the pawl disengages the pawl engagement projection 228 and the jaw engagement recess 230. This causes the jaw 204 to rotate in a clockwise direction about the jaw pivot and the post 206 which releases the striker 210 from the notch 208. Disengagement of the striker and the notch is further assisted by the outward biasing force applied by the plunger 232. As can be appreciated as the pawl 214 is rotated by the movement of the cable 246 the pin 242 remains stationary as the arm slot 244 moves relative thereto. Of course the movement of the cable 246 back to the position shown in FIG. 29 enables the latch to again engage the striker and the jaw 204 to hold the striker in the latched position.

Similar to the previously described arrangements, the latch may be changed from the latched condition to the unlatched condition by movement of the tie rod 240 of the actuator 236 to the right as shown in FIG. 31. Such movement of the tie rod by the actuator causes the pin 242 to engage the wall bounding the arm slot 244 and rotate the pawl 214 about the post 216. This causes the pawl engagement projection 228 to disengage from the jaw engagement recess 230, enabling the jaw 204 to move and disengage from the striker. Further as can be appreciated when the actuator 236 operates to return the pin 242 to the initial condition, the pawl 214 is again enabled to rotate to engage the pawl engagement projection 228 with the jaw engagement recess 230 as the striker moves to engage the notch 208 of the jaw. Of course it should be understood that these approaches are exemplary and in other arrangements other approaches may be used.

Thus the exemplary arrangements achieve improved operation, eliminate difficulties encountered in the use of prior latch apparatus and attain the useful results described herein.

In the foregoing description, certain terms have been used for brevity, clarity and understanding. However, no one necessary limitations are to be implied therefrom because such terms are used for descriptive purposes and are intended to be broadly construed. Moreover the descriptions and illustrations herein are by way of examples and the new and useful concepts and features are not limited to the exact features shown and described.

Having described the features, discoveries and principles of the exemplary arrangements, the manner in which they are constructed and operated, and the advantages and useful results attained, the new and useful features, devices, elements, arrangements, parts, combinations, systems, equipment, operations, methods, processes and relationships are set forth in the appended claims.

We claim:

1. Apparatus comprising:
a latch including:
  a housing,
  a jaw, wherein the jaw
    includes a notch configured to engage a striker,
    is movably mounted in operative connection with the housing,
    and is movable between
      a latched position in which the jaw is operative to hold the striker in engagement with the latch, and
      an unlatched position in which the striker is disengageable from the latch,
  a pawl, wherein the pawl
    is rotatably movably mounted in operative connection with the housing,
    is rotatable about a pawl pivot,
    includes a first arm portion and a second arm portion,
      wherein each of the first arm portion and the second arm portion extend radially away from the pawl pivot,
      wherein radially furthest away from the pawl pivot the first arm portion includes a distal end, and wherein the first arm portion is angularly disposed from the second arm portion,
      wherein the second arm portion includes an actuating end, wherein the actuating end is radially disposed from the pawl pivot and is accessible from outside the housing,
    wherein the pawl is rotatably movable between
      an engaged position in which the distal end of the first arm portion is in operatively engaged relation with the jaw, and is operative to hold the jaw in the latched position, a disengaged position in which the distal end of the first arm portion enables the jaw to move from the latched position to the unlatched position, an electrically operated actuator, wherein the actuator extends in the housing, is in operative engagement with the first arm portion radially intermediate of the pawl pivot and the distal end, wherein the actuator is selectively operative to cause the pawl to move from the engaged position to the disengaged position, whereby the jaw is enabled to move from the latched position to the unlatched position responsive to the actuator, wherein the actuating end is selectively movable to cause the pawl to move from the engaged position to the disengaged position independent of operation of the actuator, whereby the jaw is enabled to move from the latched position to the unlatched position responsive to actuating end movement.

2. The apparatus according to claim 1 wherein the distal end of the first arm portion and the actuating end of the second arm portion are disposed from one another at an acute angle.

3. The apparatus according to claim 1 wherein the distal end of the first arm portion and the actuating end of the second arm portion are disposed from one another at an obtuse angle.

4. The apparatus according to claim 1 and further comprising:

a jaw spring, wherein the jaw spring is in operative connection with the jaw, wherein the jaw spring is operative to cause the jaw to be biased toward the unlatched position.

5. The apparatus according to claim 1 and further comprising:

a pawl spring, wherein the pawl spring is in operative connection with the pawl, wherein the pawl spring is operative to cause the pawl to be biased toward the engaged position.

6. The apparatus according to claim 1 and further comprising:

a jaw spring, wherein the jaw spring is in operative connection with the jaw, wherein the jaw spring is operative to cause the jaw to be biased toward the unlatched position, wherein the housing further includes a pawl stop, wherein the pawl stop is operative to limit rotational movement of the pawl responsive to the biasing force of the jaw spring to the engaged position.

7. The apparatus according to claim 1 and further comprising:

a jaw spring, wherein the jaw spring is in operative connection with the jaw, wherein the jaw spring is operative to cause the jaw to be biased toward the unlatched position, a pawl spring, wherein the pawl spring is in operative connection with the pawl, wherein the pawl spring is operative to cause the pawl to be biased toward the engaged position, wherein the housing further includes a pawl stop, wherein the pawl stop is operative to limit rotational movement of the pawl responsive to the biasing force of the pawl spring to the engaged position, wherein the housing includes an arm portion housing opening, wherein the second arm portion extends outside the housing through the arm portion housing opening, and wherein the pawl stop bounds the arm portion housing opening.

8. The apparatus according to claim 1 wherein the housing includes a U-shaped housing recess, wherein the housing recess is sized to receive the striker therein, wherein in the latched position of the jaw the striker is held in the housing recess.

9. The apparatus according to claim 1 wherein the jaw includes at least one of an engagement projection and an engagement recess, wherein the distal end includes the other of the at least one engagement projection and the engagement recess, wherein in the engaged position of the pawl and in the latched position of the jaw, the at least one engagement projection and engagement recess are engaged and are operative to hold the jaw in the latched position.

10. The apparatus according to claim 1 wherein the jaw includes at least one jaw engagement projection and at least one jaw engagement recess, wherein the distal end of the pawl includes at least one pawl engagement projection and at least one pawl engagement recess, wherein in the engaged position of the pawl and the latched position of the jaw the at least one jaw engagement projection is engaged with the at least one pawl engagement recess, and the at least one pawl engagement projection is engaged with the at least one jaw engagement recess, whereby the jaw is held in the latched position.

11. The apparatus according to claim 1 wherein the actuating end of the second arm portion includes a cable engagement recess, wherein the pawl is movable responsive to cable engagement with the cable engagement recess.

12. The apparatus according to claim 1 wherein the housing includes an arm portion housing opening, wherein the second arm portion extends outside the housing through the arm portion housing opening, wherein the arm portion housing opening is bounded by a pawl stop, wherein the pawl stop is operative to engage the second arm portion and limit rotation of the pawl from the disengaged position to the engaged position.

13. The apparatus according to claim 1 wherein the actuator includes an electric motor, and one of a rotatable pinion in operative connection with the motor and a linearly movable rack in operative connection with the pinion, wherein the rack moves linearly straight responsive to rotation of the pinion, or a rotatable cam in operative connection with the motor and a linearly movable cam follower in operative connection with the cam, wherein the rack or the cam follower is in operative connection with the first arm portion, wherein the first arm portion is movable responsive to movement of the rack or the cam follower.

14. Apparatus comprising:

a latch, wherein the latch is configured to selectively hold a striker in engagement with the latch, and to release the striker from engagement with the latch, wherein the latch is selectively operative to release the striker from engagement with the latch responsive to either electrical actuation or mechanical actuation of the latch, wherein the latch includes:

a housing, a jaw, wherein the jaw is movably mounted in operative connection with the housing, wherein the jaw includes a notch, wherein the notch is configured to receive the striker therein, wherein the jaw is movable between a latched position, wherein in the latched position the striker is held in engagement with the jaw in the notch, and an unlatched position, wherein in the unlatched position the striker is enabled to disengage from the jaw, a pawl, wherein the pawl is rotatably movably mounted in operative connection with the housing, wherein the pawl is rotationally movable about a pawl pivot and includes a first radially extending arm portion and a second radially extending arm portion, wherein the first and second radially extending arm portions are angularly disposed from one another, wherein the second arm portion extends outside the housing and terminates outside the housing at a movable actuating end, wherein the first arm portion terminates within the housing at a distal end, wherein the pawl is rotatable between an engaged position in which the distal end is in engagement with the jaw in the latched position and is operative to hold the jaw in the latched position, a disengaged position in which the jaw is enabled to move from the latched position to the unlatched position, wherein the first arm portion includes an arm opening, wherein the arm opening extends in the first arm portion radially intermediate of the pawl pivot and the distal end, a pin, wherein the pin extends in the arm opening, an electrical actuator, wherein the actuator is in operative connection with the pin, wherein the actuator is operative to move the pin in engagement with the arm opening so that the pawl is moved from the engaged position to the disengaged position, whereby the jaw is enabled to move from the latched position to the unlatched position, and wherein the pawl is movable independent of the actuator responsive to movement of the actuating end from the engaged position to the disengaged position, whereby the jaw is enabled to move from the latched position to the unlatched position.

15. The apparatus according to claim 14 wherein the arm opening comprises an arm slot, wherein the pin is movable relative to and within the arm slot, and wherein the arm slot is bounded by an arm slot side wall, wherein the actuator is selectively operative to move the pawl from the engaged position to the disengaged position by movement of the pin in abutting engagement with the arm slot side wall toward the actuator, and wherein when the pawl is moved by movement of the actuating end between the engaged position in the disengaged position, the pin is stationary and the slot is moved relative to the pin while the pin does not impede pawl movement by pin engagement with the arm slot side wall.

16. The apparatus according to claim 14 wherein the first and second radially extending arm portions are disposed from one another at an acute angle.

17. The apparatus according to claim 14 wherein the first and second radially extending arm portions are disposed from one another at an obtuse angle.

18. Apparatus comprising:

a latch including:

a housing, a jaw, wherein the jaw includes a notch configured to engage a striker, is movably mounted in operative connection with the housing, and is movable between a latched position in which the jaw is operative to hold the striker in engagement with the latch, and an unlatched position in which the striker is disengageable from the latch, a pawl, wherein the pawl is rotatably movably mounted in operative connection with the housing, is rotatable about a pawl pivot, includes a first arm portion and a second arm portion, wherein each of the first arm portion and the second arm portion extend radially away from the pawl pivot, and the first arm portion is angularly disposed from the second arm portion, wherein the first arm portion includes a distal end, and an arm slot, wherein the arm slot, is radially intermediate of the pawl pivot and the distal end, is bounded by an arm slot side wall, wherein the second arm portion includes an actuating end, wherein the actuating end is radially disposed from the pawl pivot and is accessible from outside the housing, wherein the pawl is rotatably movable between an engaged position in which the distal end of the first arm portion is in operatively engaged relation with the jaw and is operative to hold the jaw in the latched position, and a disengaged position in which the distal end of the first arm portion enables the jaw to move from the latched position to the unlatched position, an electrically operated actuator, wherein the actuator extends in the housing, includes a pin, wherein the pin extends in the arm slot, wherein the actuator is selectively operative to cause movement of the pin, such that the pin is operative to cause movement of the pawl through engagement of the pin and the arm slot side wall, from the engaged position to the disengaged position, whereby the jaw is enabled to move from the latched position to the unlatched position responsive to the actuator, wherein the actuating end is selectively movable to cause the pawl to move from the engaged position to the disengaged position independent of operation of the actuator, whereby the jaw is enabled to move from the latched position to the unlatched position responsive to actuating end movement.

19. Apparatus comprising:

a latch including:

a housing, a jaw, wherein the jaw includes a notch configured to engage a striker, is rotatably movably mounted in operative connection with the housing, and is movable between a latched position in which the jaw is operative to hold the striker in engagement with the latch, and an unlatched position in which the striker is disengageable from the latch, and a secondary latched position, wherein the secondary latched position is rotationally intermediate of the latched position and the unlatched position, wherein in the secondary latched position the jaw is operative to hold the striker within the notch and in engagement with the latch, a pawl, wherein the pawl is rotatably movably mounted in operative connection with the housing, is rotatable about a pawl pivot, includes a first arm portion and a second arm portion, wherein each of the first arm portion and the second arm portion extend radially away from the pawl pivot, wherein the first arm portion includes a distal end, and wherein the first arm portion is angularly disposed from the second arm portion, wherein the second arm portion includes an actuating end, wherein the actuating end is radially disposed from the pawl pivot and is accessible from outside the housing, wherein the pawl is rotatably movable between an engaged position in which the distal end of the first arm portion is in operatively engaged relation with the jaw and is operative to hold the jaw in the latched position, a disengaged position in which the distal end of the first arm portion enables the jaw to move from the latched position to the unlatched position, and a secondary engaged position in which the distal end of the first arm portion is in engagement with the pawl in the secondary latched position, wherein in the secondary latched position the jaw is prevented by engagement with the pawl from being moved to the unlatched position but is enabled to move in engagement with the pawl from the secondary latched position to the latched position, an electrically operated actuator, wherein the actuator extends in the housing, is in operative engagement with the first arm portion radially intermediate of the pawl pivot and the distal end, wherein the actuator is selectively operative to cause the pawl to move from the engaged position to the disengaged position, whereby the jaw is enabled to move from the latched position to the unlatched position responsive to the actuator, wherein the actuating end is selectively movable to cause the pawl to move from the engaged position to the disengaged position independent of operation of the actuator, whereby the jaw is enabled to move from the latched position to the unlatched position responsive to actuating end movement.

20. Apparatus comprising:

a latch including:

a housing, a jaw, wherein the jaw includes a notch configured to engage a striker, is movably mounted in operative connection with the housing, and is movable between a latched position in which the jaw is operative to hold the striker in engagement with the latch, and an unlatched position in which the striker is disengageable from the latch, a pawl, wherein the pawl is rotatably movably mounted in operative connection with the housing, is rotatable about a pawl pivot, includes a first arm portion and a second arm portion, wherein each of the first arm portion and the second arm portion extend radially away from the pawl pivot, wherein radially furthest away from the pawl pivot the first arm portion includes a distal end, and wherein the first arm portion is angularly disposed from the second arm portion, wherein the second arm portion includes an actuating end, wherein the actuating end is radially disposed from the pawl pivot and is accessible from outside the housing, wherein the pawl is rotatably movable between an engaged position in which the distal end of the first arm portion is in engaged relation with the jaw and is operative to hold the jaw in the latched position, a disengaged position in which the distal end of the first arm portion enables the jaw to move from the latched position to the unlatched position, an electrically operated actuator, wherein the actuator extends in the housing, is in engagement with the first arm portion at a location that is radially intermediate of the pawl pivot and the distal end, wherein the actuator is selectively operative to move the first arm portion at the location and cause the pawl to move from the engaged position to the disengaged position, whereby the jaw is enabled to move from the latched position to the unlatched position responsive to the actuator, wherein the actuating end is selectively movable to cause the pawl to move from the engaged position to the disengaged position independent of operation of the actuator, whereby the jaw is enabled to move from the latched position to the unlatched position responsive to actuating end movement.

21. Apparatus comprising:

a latch including:

a housing, a jaw, wherein the jaw includes a notch configured to engage a striker, is movably mounted in operative connection with the housing, and is movable between a latched position in which the jaw is operative to hold the striker in engagement with the latch, and an unlatched position in which the striker is disengageable from the latch, a pawl, wherein the pawl is rotatably movably mounted in operative connection with the housing, is rotatable about a pawl pivot, includes a first arm portion and a second arm portion, wherein each of the first arm portion and the second arm portion extend radially away from the pawl pivot, and wherein the first arm portion is angularly disposed from the second arm portion, wherein the first arm portion includes a distal end, and an arm slot, wherein the arm slot is bounded by an arm slot side wall, wherein the second arm portion includes an actuating end, wherein the actuating end is radially disposed from the pawl pivot and is accessible from outside the housing, wherein the pawl is rotatably movable between an engaged position in which the distal end of the first arm portion is in operatively engaged relation with the jaw, and is operative to hold the jaw in the latched position, a disengaged position in which the distal end of the first arm portion enables the jaw to move from the latched position to the unlatched position, an electrically operated actuator, wherein the actuator extends in the housing, includes a pin, is in operative engagement with the first arm portion by the pin extended in the arm slot radially intermediate of the pawl pivot and the distal end, wherein the actuator is selectively operative to move the pin and cause the pawl to move through engagement of the pin and the arm slot side wall, whereby the pawl is moveable by the actuator from the engaged position to the disengaged position, whereby the jaw is enabled to move from the latched position to the unlatched position responsive to the actuator, wherein movement of the actuating end independent of movement of the pawl by the actuator, is operative to cause the pawl to move from the engaged position to the disengaged position while the pin is stationary and the arm slot is moved relative to the pin, whereby the jaw is enabled to move from the latched position to the unlatched position responsive to actuating end movement.

22. Apparatus comprising:

a latch including:

a housing, a jaw, wherein the jaw includes a notch configured to engage a striker, is movably mounted in operative connection with the housing, and is movable between a latched position in which the jaw is operative to hold the striker in engagement with the latch, and an unlatched position in which the striker is disengageable from the latch, wherein the housing includes a switch, wherein the switch is in operative connection with the jaw, wherein the switch is always in a first electrical condition when the jaw is in the latched position and is always in a second electrical condition that is different from the first electrical condition, when the jaw is in the unlatched position, a pawl, wherein the pawl is rotatably movably mounted in operative connection with the housing, is rotatable about a pawl pivot, includes a first arm portion and a second arm portion, wherein each of the first arm portion and the second arm portion extend radially away from the pawl pivot, wherein the first arm portion includes a distal end, and wherein the first arm portion is angularly disposed from the second arm portion, wherein the second arm portion includes an actuating end, wherein the actuating end is radially disposed from the pawl pivot and is accessible from outside the housing, wherein the pawl is rotatably movable between an engaged position in which the distal end of the first arm portion is in operatively engaged relation with the jaw, and is operative to hold the jaw in the latched position, a disengaged position in which the distal end of the first arm portion enables the jaw to move from the latched position to the unlatched position, an electrically operated actuator, wherein the actuator extends in the housing, is in operative engagement with the first arm portion radially intermediate of the pawl pivot and the distal end, wherein the actuator is selectively operative to cause the pawl to move from the engaged position to the disengaged position, whereby the jaw is enabled to move from the latched position to the unlatched position responsive to the actuator, wherein the actuating end is selectively movable to cause the pawl to move from the engaged position to the disengaged position independent of operation of the actuator, whereby the jaw is enabled to move from the latched position to the unlatched position responsive to actuating end movement.

* * * * *